(12) United States Patent
Al-Saggaf et al.

(10) Patent No.: US 11,424,906 B1
(45) Date of Patent: Aug. 23, 2022

(54) SECURE ENCRYPTION AND DECRYPTION METHOD AND SYSTEM

(71) Applicant: King Abdulaziz University, Jeddah (SA)

(72) Inventors: Ubaid M. Al-Saggaf, Jeddah (SA); Muhammad Moinuddin, Jeddah (SA); Asmaa Ubaid Alsaggaf, Jeddah (SA); Maamar Bettayeb, Sharjah (AE); Said Djennoune, Tizi-Ouzou (DZ)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/516,819

(22) Filed: Nov. 2, 2021

(51) Int. Cl.
*H04L 9/00* (2022.01)
*H04L 9/12* (2006.01)

(52) U.S. Cl.
CPC ............... *H04L 9/001* (2013.01); *H04L 9/12* (2013.01)

(58) Field of Classification Search
CPC ... H04L 9/001; H04L 9/12; H04L 9/32; H04L 9/0869; H04L 9/085
See application file for complete search history.

(56) References Cited

U.S. PATENT DOCUMENTS

| | | | | |
|---|---|---|---|---|
| 6,049,614 | A * | 4/2000 | Kim | H04L 27/001 380/263 |
| 6,704,420 | B1 * | 3/2004 | Goedgebuer | H04B 10/85 380/256 |
| 7,072,469 | B1 * | 7/2006 | Oudaltsov | H04L 9/001 380/263 |

(Continued)

FOREIGN PATENT DOCUMENTS

| | | |
|---|---|---|
| CN | 109167657 A | 1/2019 |
| CN | 109412808 B | 11/2020 |

(Continued)

OTHER PUBLICATIONS

Mishra, et al. ; Finite-time synchronization of multi-scroll chaotic systems with sigmoid non-linearity and uncertain terms ; Chinese Journal of Physics 2020 ; 21 Pages.

(Continued)

*Primary Examiner* — Hosuk Song
(74) *Attorney, Agent, or Firm* — Oblon, McClelland, Maier & Neustadt, L.L.P.

(57) ABSTRACT

Memristor based chaotic oscillators exhibit complex dynamics. They are often chosen for secure communication owing to their interesting feature. In chaos-based secure communication applications using the master-slave configuration, synchronization is a central issue. Most of the synchronization methods proposed in the literature are asymptotic. In practice, it is desirable that synchronization be established in a predefined time. This invention provides new developments in the design of high-gain observers with an unknown input dedicated for predefined-time synchronization of memristor based chaotic systems. The proposed predefined-time extended high gain observer is constructed on the basis of a time-dependent coordinates transformation based on modulating functions that annihilate the effect of initial conditions on the synchronization time. Both noise-free channel and noisy channel are considered. Simulations performed on a numerical example illustrated the efficiency of proposed approaches.

16 Claims, 29 Drawing Sheets

(56) References Cited

U.S. PATENT DOCUMENTS

| | | | | |
|---|---|---|---|---|
| 8,212,621 | B2 * | 7/2012 | Strachan | H03B 7/02 |
| | | | | 331/2 |
| 8,644,362 | B1 * | 2/2014 | Lauer | H04B 1/707 |
| | | | | 375/141 |
| 9,853,809 | B2 * | 12/2017 | Fernandez | H03B 29/00 |
| 10,153,729 | B2 * | 12/2018 | Kumar | H03K 19/20 |
| 2007/0050614 | A1 * | 3/2007 | Lin | H04L 9/12 |
| | | | | 713/150 |

FOREIGN PATENT DOCUMENTS

| | | |
|---|---|---|
| CN | 112003700 A | 11/2020 |
| EP | 1 129 542 B1 | 10/2006 |
| KR | 1716465 B1 | 3/2017 |

OTHER PUBLICATIONS

Dimassi, et al. ; Adaptive unknonwn-input observers-based synchronization of chaotic circuits for secure telecommunication ; HAL archives-ouvertes.fr; Jun. 6, 2013 ; 14 Pages.

* cited by examiner

SECURE ENCRYPTION AND DECRYPTION METHOD AND SYSTEM

BACKGROUND

Technical Field

The present disclosure is directed to systems and methods for secure encryption and decryption based on fixed-time synchronization of memristor chaotic systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Chaotic systems have many application fields in physical sciences and engineering, and particularly, chaos has been successfully investigated in secure communication systems. Due to the atypical properties of chaotic systems like wide-band, sensitivity to initial conditions, and the unpredictability of their evolution, methods of encrypting confidential messages with chaotic signals have significantly improved the security of crypto-systems.

A secure communication scheme is made up of a master or a drive chaotic system that plays the role of the emitter and a slave or response chaotic system that plays the role of the receiver. Secret information can be hidden in the chaotic unintelligible signal delivered by the emitter and sent to the receiver through a public channel. The recovery of the secret information at the receiver side requires that the drive and the response systems are well synchronized. The synchronization of two chaotic systems constitutes a significant problem. There have been attempts to setup predefined-time synchronization. For example, attempts based on sliding mode controllers implementing an active control Lyapunov function. These techniques require availability of all state variables of a drive system, which leads to communication channel overload.

Another drawback in conventional techniques is that they do not deal with the presence of an unknown input. Dealing with the unknown input is important when considering information encryption by an inclusion method in chaotic dynamics where the secret message represents the unknown input. Another challenge in conventional techniques is dealing with noise. When noise is present in a transmission channel, recovery of the secret message may be inaccurate or even impossible. No known conventional techniques have adequately addressed problems of transmission channel noise that may destroy the predefined-time synchronization.

As a result, existing methods and technologies suffer from one or more drawbacks including synchronization problems, dealing with unknown input, and problems of transmission channel noise hindering their adoption.

Accordingly, it is one object of the present disclosure to provide methods and systems for secure encryption and decryption that overcome the aforementioned drawbacks.

SUMMARY

In an exemplary embodiment, a secure encryption-decryption system is disclosed. The secure encryption-decryption system includes an emitter and a receiver. The emitter includes an encryptor and a single channel. The encryptor is configured to generate a chaotic signal including a confidential message, and to modulate the generated chaotic signal. The single channel over which the modulated chaotic signal is communicated from the emitter. The receiver is configured to receive the modulated chaotic signal from the single channel. The receiver includes a decryptor configured to construct an unknown input high-gain observer with single-channel predefined-time synchronization to demodulate the received modulated chaotic signal to output the confidential message.

In another exemplary embodiment, a secure encryption-decryption method is disclosed. The secure encryption-decryption method includes an emitter having an encryptor generating a chaotic signal including a confidential message and modulating the generated chaotic signal and communicating, over a single channel, the modulated chaotic signal from the emitter. The method includes receiving, at a receiver, the modulated chaotic signal from the single channel, with the receiving including constructing, by a decryptor, an unknown input high-gain observer with single-channel predefined-time synchronization and demodulating the received modulated chaotic signal to output the confidential message.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
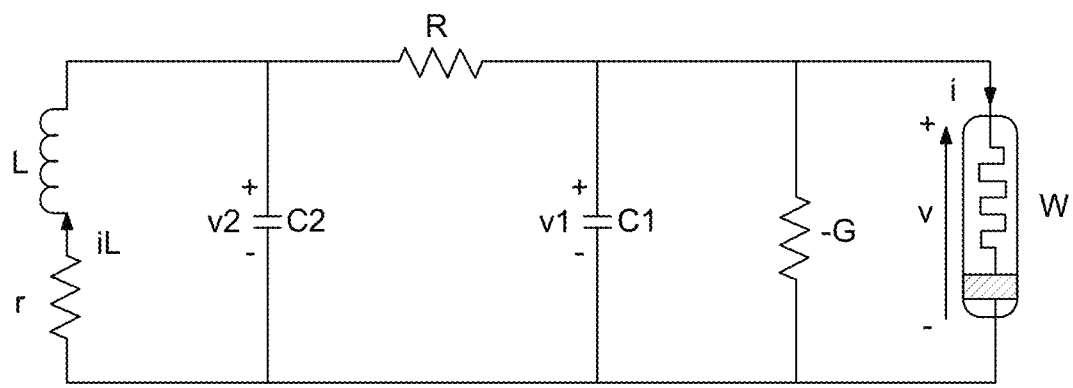
FIG. 1 is a schematic diagram of a Chua's memristive chaotic oscillator using flux-controlled memristor.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method for secure encryption and decryption based on fixed-time synchronization of memristor chaotic systems. The disclosure provides a solution to a single-channel predefined-time synchronization of memristive chaotic systems by considering a challenge of recovering a secret message and taking into account noise in a transmission channel. The disclosure provides modulating function methods and systems used as annihilators of initial conditions. Also, the disclosure provides a fixed-time extended high-gain observer that converges in a fixed time, instantaneously as a deadbeat observer. The disclosure enables choosing a settling time that can be arbitrarily chosen independently of unknown initial conditions and system parameters.

A memristor (also known as memory resistor) is a non-volatile electronic memory device belonging to a fourth class of electrical circuit that combines a resistor, a capacitor, and an inductor, that exhibit their unique properties primarily at a nanoscale. Memristors are divided in two classes: voltage-controlled memristors and flux-controlled memristors. Memristor based electronic oscillators are classified as nonlinear dynamical systems called memristive systems. Memristor based chaotic oscillators exhibit more complex dynamics and are often chosen for secure communication due to their interesting features. In a memristor based Chua's system, a classical piecewise linear Chua's diode is replaced by a flux-controlled memristor to generate a chaotic behavior. A relation between the charge q and the flux φ is modeled by a following nonlinear cubic function $$q(\emptyset) = a\emptyset + b\emptyset^3 \tag{1}$$

where a and b are positive constants. A memristance $W(\emptyset)$ is obtained by:

$$W(\emptyset) = \frac{dq}{d\emptyset} = a + 3b\emptyset^2 \tag{2}$$

FIG. 1 illustrates a basic circuit diagram of the Chua's memristive chaotic oscillator using the flux-controlled principle. As illustrated, FIG. 1 shows a resistor R, a resistor r, capacitors C1 and C2, and inductor L connected together. Considering based on FIG. 1, let $$\alpha = \frac{1}{C_1}, \beta = \frac{1}{L}, \gamma = \frac{1}{L}, \xi = G, C_2 = 1 \text{ and } R = 1.$$

In an aspect, introducing following state variables $x_1(t)=v_1(t)$, $x_2(t)=v_2(t)$, $x_3(t)=i_L(t)$, and $x_4(t)=\phi(t)$, the circuit is modeled using following nonlinear dynamical system.

$$\dot{x}_1(t) = \alpha(\xi-1)x_1(t) + \alpha x_2(t) - \alpha W(x_4(t))x_1(t)$$

$$\dot{x}_2(t) = x_1(t) - x_2(t) - x_3(t)$$

$$\dot{x}_3(t) = -\beta x_2(t) + \gamma x_3(t)$$

$$\dot{x}_4(t) = x_1(t); \tag{3}$$

with $W(x_4(t)) = a + 3bx_4^2(t)$. Further, the numerical values of parameters are set to $$\alpha = 10, \beta = \frac{100}{7}, \gamma = 0.1, \xi = \frac{9}{7}, a = \frac{1}{7} \text{ and } b = \frac{2}{7}.$$

Figure 2A:
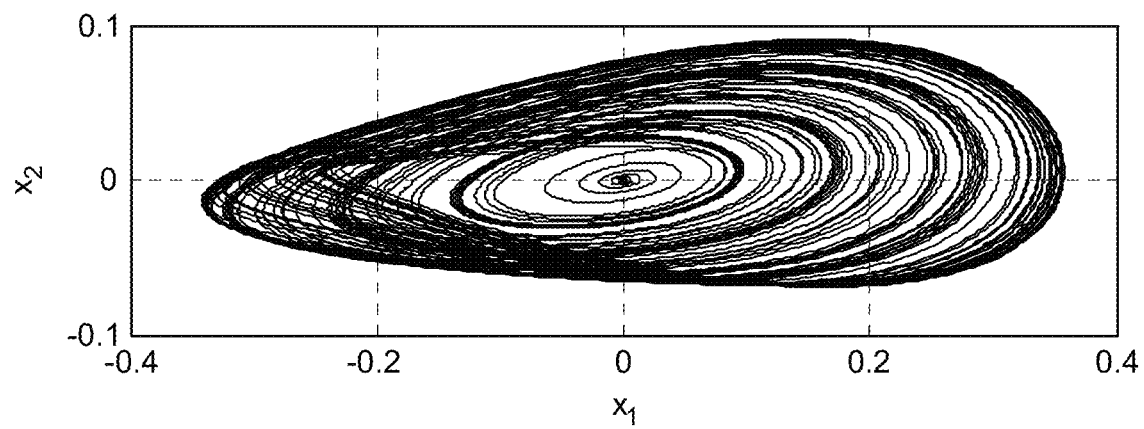
FIG. 2 is a plot illustrating strange attractors in 2D projections.
Figure 2B:
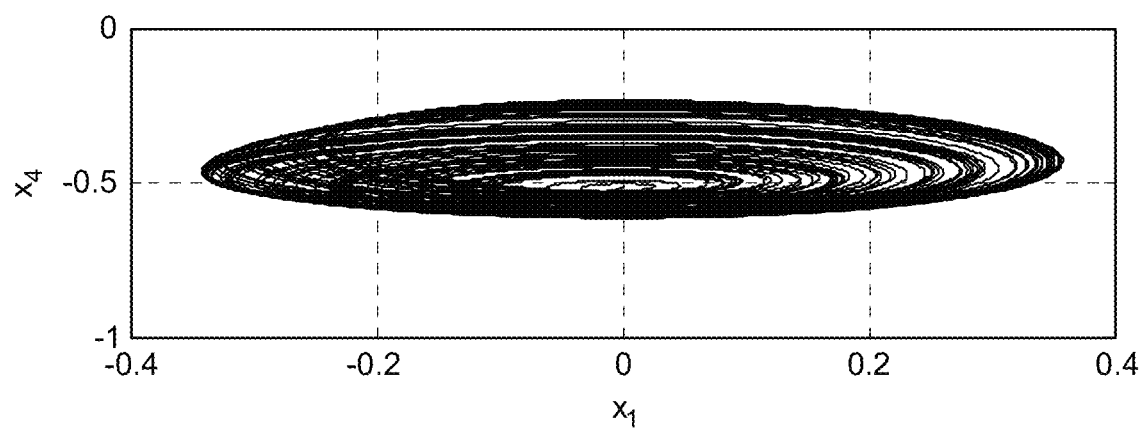
Figure 2C:
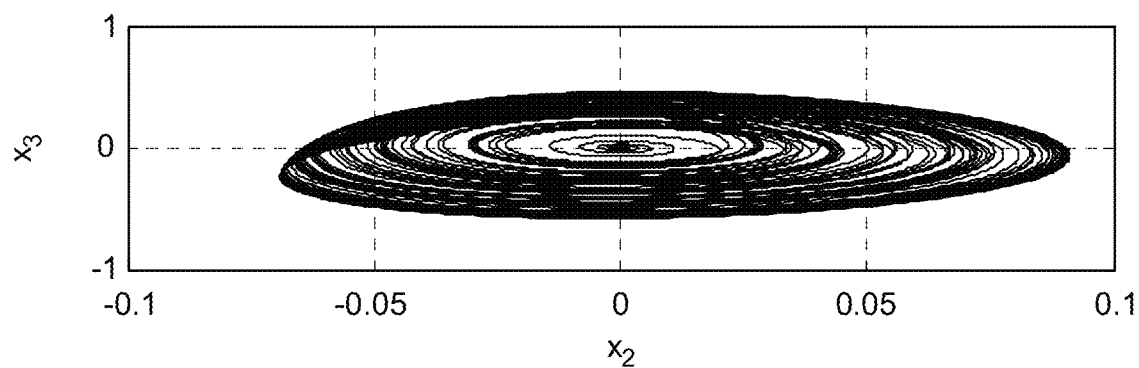
Figure 2D:
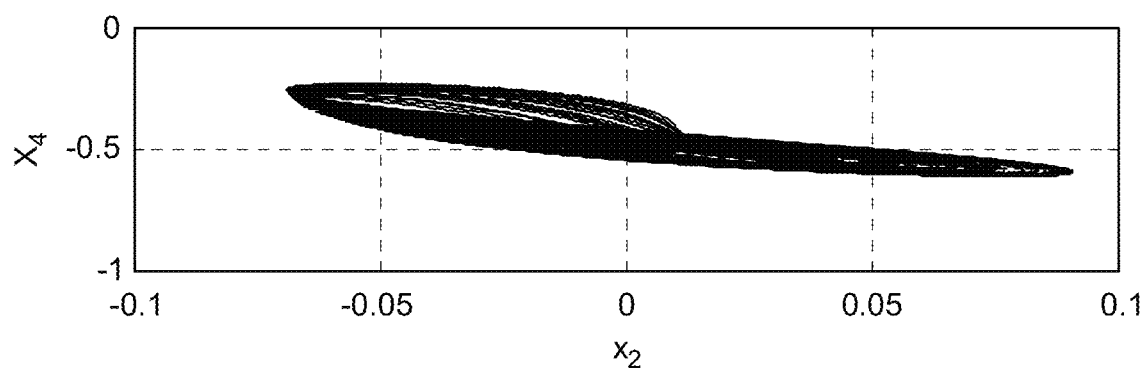

For these values of parameters, the circuit of FIG. 1 exhibits a chaotic behavior as illustrated in FIG. 2A-FIG. 2D which plots 2-scroll chaotic attractors obtained for initial condition $x_1(t_0)=10^{-10}$, $x_2(t_0)=0$, $x_3(t_0)=0$, and $x_4(t_0)=-0.515$, where $t_0=0$ denotes an initial time. FIG. 2A illustrates a plot demonstrating $x_1$ vs $x_2$. FIG. 2B illustrates a plot demonstrating $x_1$ vs $x_4$. FIG. 2C illustrates a plot demonstrating $x_2$ vs $x_3$, and FIG. 2D illustrates a plot demonstrating $x_2$ vs $x_4$.

In an aspect, the chaotic behavior of the Chua's memristive chaotic oscillator is used for encrypting secret information that is sent from an emitter to a receiver. In a conventional inclusion method, a confidential message is injected in a derivative of a state variable of the chaotic emitter at the emitter side. An amplitude of the message is chosen sufficiently small so that a chaotic behavior is not required to be altered. A different state is chosen for a transmitted signal output. Also, the transmitted signal in the conventional inclusion method does not carry any information of the secret message and any information of key parameters.

Figure 3:
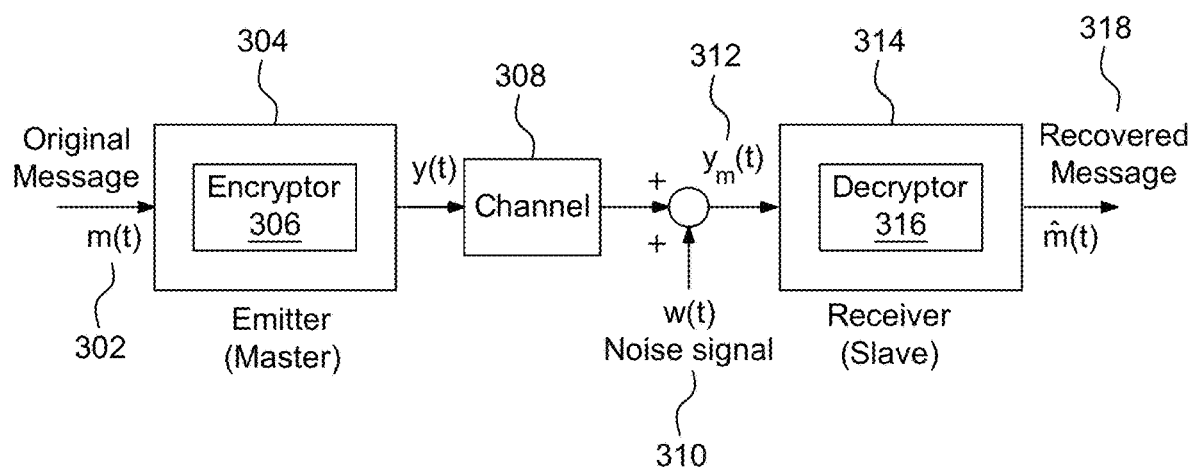
FIG. 3 is a single channel master-slave configuration based secure communication scheme, according to certain embodiments.

FIG. 3 of a present embodiment illustrates a master-slave configuration of a communication scheme used in which a confidential message (also referred to as an original message) m(t) 302 is hidden in a chaotic dynamic by an inclusion method. FIG. 3 illustrates an emitter 304 having an encryptor 306. In an aspect, the emitter 304 is a chaotic emitter including a memristive chaotic oscillator. The encryptor 306 is configured to generate a chaotic signal including a confidential message, and to modulate the generated chaotic signal. The emitter 304 communicates the modulated chaotic signal y(t) through a single channel 308 for communication. The modulated chaotic signal y(t) is chosen as $y(t)=x_4(t)$, while the message m(t) is injected in a derivative of the third state variable $x_3(t)$. Thus, the emitter 304 (also known as a drive (master) system) is given by:

$$\dot{x}(t) = f(x(t)) + Bm(t)$$

$$y(t) = h(x); \tag{4}$$

where $x(t) = [x_1(t) \ x_2(t) \ x_3(t) \ x_4(t)]^T \in \mathbb{R}^n$, n=4, with initial condition $x_0 = x(t_0)$ and $B = [0 \ 0 \ 1 \ 0]^T$, $h(x) = x_4(t)$, $$f(x) = [\alpha(\xi-1)x_1 + \alpha x_2 - \alpha W(x_4)x_1, x_1 - x_2 + x_3, -\beta x_2 + \gamma x_3 x_1]^T; \tag{5}$$

In a non-ideal or practical environment, there is an additive noise w(t) 310 (referred to as noise signal) in the channel 308 connecting the emitter 304 (master) to a receiver 314 (slave). Due to the additive noise, y(t) gets corrupted and becomes $y_m(t)=y(t)+w(t)$. In an ideal case of having a noiseless channel, the signal transmitted to the receiver 314 is $y_m(t)=y(t)$. The modulated chaotic signal (corrupted signal or non-corrupted signal) is transmitted to the receiver 314. In an implementation, the receiver 314 is a fixed-time extended high gain observer. The receiver 314 is configured to receive the modulated chaotic signal from the single channel 308. The receiver 314 includes a decryptor 316 configured to construct an unknown input high-gain observer with single-channel predefined-time synchronization to demodulate the received modulated chaotic signal to output the confidential message m(t) 302. The decryptor 316 performs demodulation based on a selected modulation function as a positive increasing function with no zero-crossing and that implements first and second coordinate transformations. In an aspect, the decryptor 316 estimates the derivative of the third state variable of the emitter 304 to output the confidential message m(t) 302. In an aspect, the decryptor 316 executes a Runge-Kutta algorithm with a sampling step h in demodulating the received modulated chaotic signal (explained in detail below). Some definitions on finite-time, fixed-time and predefined-time stability used in the disclosure are provided below.

Definition 1: In a system:

$$\dot{X}(t) = f(X(t)); \tag{6}$$

where $X(t) \in \mathbb{R}^n$ denotes the system state with the initial condition $X_0 = X(t_0)$. An origin is assumed to at an equilibrium, i.e., f(0)=0. The origin is globally finite-time stable if it is globally asymptotically stable and if, for every initial condition $X_0 \in \mathbb{R}^n$, the solution $X(t, X_0)$ of (6) reaches the origin at some finite-time moment, i.e., $X(t, X_0)=0 \ \forall t \geq T(X_0)$ where $T(X_0): \mathbb{R}^n \to \mathbb{R}_+$ is called the settling time function.

Definition 2. The origin of (6) is globally fixed-time stable if it is globally finite-time stable and if a settling time $T(X_0)$ is bounded, that is, there exists $T_{max} > t_0$ such that, for every initial condition $X_0 \in \mathbb{R}^n$, $T(X_0) \leq T_{max}$.

Definition 3. The origin of (6) is globally predefined-time stable if it is globally fixed-time stable and if for a predefined time $T_p$ chosen in advance, the settling time is such that: $T(X_0) \leq T_p$, $\forall X_0 \in \mathbb{R}^n$. A concept of finite-time boundedness is an extension of finite-time stability of the system subject to an external input.

Definition 4: A nonlinear system (4) is considered which represents a master system (or the emitter 304). A slave system (or receiver) corresponding to the master system can be described by as a following observer:

$$\dot{\hat{x}}(t) = F(\hat{x}(t), \hat{m}(t), y_m(t), \hat{y}(t))$$

$$\hat{y}(t) = H(\hat{x}(t))$$

$$\hat{m}(t) = G(\hat{x}(t), y_m(t)); \quad (7)$$

Then the master system (4) and the slave system (7) are said to be predefined-time synchronized with a preassigned synchronization settling time $t_a$, if an estimation error $e_x(t) = x(t) - \hat{x}(t)$ is predefined-time stable, i.e. $\|e_x(t)\| = 0$, $\forall t \geq t_a$ for any initial conditions $x_0 = x(t_0)$ and $\hat{x}_0 = \hat{x}(t_0)$ such that $\hat{x}_0 \neq x_0$. Systems based (4) and (7) are said to be predefined-time synchronized if there exists a positive constant such that the estimation error $e_x$ satisfies:

$$\|e_x(t)\| = \|x(t) - \hat{x}(t)\| \leq \epsilon_x, \forall t \geq t_a; \quad (8)$$

Described below is a high-gain observer with classical linear action to achieve single channel predefined-time synchronization. The following lemmas are defined and used in the disclosure.

Lemma 1. Consider a following linear system $$\dot{e}(t) = A_e e(t) + B_e d(t); \quad (9)$$

where $e(t) \in \mathbb{R}^n$, $e_0 = e(t_0)$ is an initial condition, $d(t)$ is a bounded disturbance such that $|d(t)| \leq D$. The matrix $A_e$ as provided is a Hurwitz matrix. The Hurwitz matrix is a structured real square matrix constructed with coefficients of a real polynomial. Let $V = e^T(t) P e(t)$ be a Lyapunov function where P is a positive definite matrix satisfying the Lyapunov equation:

$$A_e^T P + P A_e = -I_n \quad (10)$$

where $I_n$ denotes the n×n identity matrix. Then there exist positive constants $\rho_i$, $i = 0, 1, 2$ such that $e(t)$ is bounded as follows:

$$\|e_x(t)\| \leq \max\{\rho_0 e^{-\rho_1 t} \|e_0\|, \rho_2 D\}; \quad (11)$$

Lemma 2: Consider matrices $A \in \mathbb{R}^{n \times n}$, $C \in \mathbb{R}^{1 \times n}$, for any given dimension n, defined in a Brunowski form as follows:

$$A = \begin{bmatrix} 0 & 1 & 0 & \cdots & 0 \\ 0 & 0 & 1 & \cdots & 0 \\ \vdots & \vdots & \vdots & \vdots & \vdots \\ 0 & 0 & 0 & \cdots & 1 \\ 0 & 0 & 0 & \cdots & 0 \end{bmatrix}, C = [1 \; 0 \; \cdots \; 0]; \quad (12)$$

Considering $\sigma_1$ and $\sigma_2$ be two fixed positive real numbers, and considering the following matrix:

$$\mathbb{M} = \begin{bmatrix} A & \mathbb{L} \\ -\sigma_2 C^T C & -\sigma_1 I_n + \sigma_2 A^T \end{bmatrix}; \quad (13)$$

where $\mathbb{L} = \text{diag}\{L_i, i = \overline{1,n}\}$, L is defined to be $L = [L_1 \; L_2 \; \cdots \; L_n]^T$. In an aspect, if the real gains $L_i$, $i = \overline{1,n}$ are chosen such that every eigenvalue $\lambda_i$ of (A−LC) satisfies the sector inclusion $\sigma_1^2 X_i + \sigma_2 Y_i^2 < 0$, where $X_i$ and $Y_i$ denote the real and imaginary parts of $\lambda_i$, respectively, then (A−LC) and $\mathbb{M}$ are Hurwitz matrices.

In an aspect, modulating functions may be used to minimize or nullify an effect of initial conditions on estimation of state variables. The modulating function is defined as follows:

Definition 5: Consider the positive real-valued function $\mu(t) \in C^{i-1}$: $\mathbb{R}_+ \to \mathbb{R}_+$. Assume that $\mu(t)$ and its derivatives $$\mu^j(t) = \frac{d^j \mu(t)}{dt^j}, j = 0, 1, 2, \ldots, i-1$$

satisfy vanishing conditions:

$$\mu^j(t_0) = 0 \; \forall j = 0, 1, \ldots i-1$$

$$\mu^j(t) \neq 0 \text{ for } t > t_0, \forall j = 0, 1, \ldots i-1, \quad (14)$$

It may be assumed that $\mu(t)$ and its derivatives $\mu^j(t)$, $j = 0, 1, \ldots, i$ are bounded. Based on the assumption, there may be positive constants $M_j$, $j = 0, 1, 2, \ldots, i$ such that $|\mu^j(t)| \leq M_j$, $j = 0, 1, 2, \ldots, i$, $\forall t \geq 0$, then $\mu(t)$ is called an −i-th order modulating function. The modulating function $\mu(t)$ is chosen as a positive increasing function so that $\mu(t_0) = 0$ and $t \to \infty \mu(t) = A_\mu$, where $A_\mu$ denotes a finite constant. Besides, for all $t > t_0$, modulating functions $\mu(t)$ have no zero-crossing. An example of such function is $\mu(t) = A_\mu (1 - e^{-\lambda(t-t_0)})^i$, $\lambda > 0$, $A_\mu > 0$ The system based on (4) with m(t) as the input and and the output y(t) has a relative degree r equal to its dimension, i.e., r = n = 4. Considering the following coordinates transformation:

$$z_i(t) = L_f^{i-1} h(x) = \Phi_i(x), i = 1, 2, 3, 4; \quad (15)$$

where $L_f^j h(x)$ denotes the j-th Lie derivative of the scalar function h(x) along the vector field f(x) defined as:

$$L_f h(x) = \frac{\partial h(x)}{\partial(x)} f(x) \quad (16)$$

$$L_f^j h(x) = L_f(L_f^{j-1} h(x)), j = 1, 2, \ldots, L_f^0 h(x) = h(x)$$

The following is obtained:

$$\Phi_1(x) = x_4$$

$$\Phi_2(x) = x_1$$

$$\Phi_3(x) = \alpha(\xi - 1) x_1 + \alpha x_2 - \alpha W(x_4) x_1$$

$$\Phi_4(x) = \alpha \{1 + \alpha(\xi - 1 - W(x_4))^2\} x_1 + \alpha x_3 + \alpha \{\alpha(\xi - 1 - W(x_4)) - 1\} x_2 - 6 \alpha b x_4 x_1^2; \quad (17)$$

The Lie derivative is a function that evaluates a change of a tensor field along a flow defined by another vector field. Further, defining $z = \Phi(x)$, where $\Phi(x) = [\Phi_1(x) \; \Phi_2(x) \; \Phi_3(x) \; \Phi_4(x)]^T$ and $z = [z_1 \; z_2 \; z_3 \; z_4]^T$. Since $$det\left(\frac{\partial \Phi(x)}{\partial(x)}\right) = \alpha^2 \neq 0 \; \forall x \in \mathbb{R}^4, \text{ then } \Phi(x)$$

defines a global diffeomorphism in $\mathbb{R}^4$. It is implied that inverse of z, that is $x=\Phi^{-1}(z)$ exists everywhere in $\mathbb{R}^4$. The inverse mapping is given by:

$$x_1 = z_2$$
$$x_2 = \frac{1}{\alpha}z_3 - (\xi - 1 - W(z_1))z_2$$
$$x_3(t) = \frac{1}{\alpha}z_4 - \{1 + \alpha(\xi - 1 - W(z_1))^2\}z_2 + 6bz_1 z_2^2 -$$
$$\left\{\alpha(\xi - 1 - W(z_1)) - 1\right\}\left\{\frac{1}{\alpha}z_3 - (\xi - 1 - W(z_1))z_2\right\}x_4 = z_1;$$
(18)

where $W(z_1) = a + 3bz_1^2$. In the new coordinates, the system is provided in normal form as given by:

$$\dot{z}_i(t) = z_{i+1}(t), \ i=1,2,3$$
$$\dot{z}_4(t) = \omega(z) + \alpha m(t)$$
$$y(t) = z_1(t);$$
(19)

where $$\omega(x) = \alpha^2\{1 + \alpha(\xi - 1 - W(x_4))^2 - 12bx_4 x_1\}\{(\xi - 1_w(x_4))x_1 + x_2\} - 12b\alpha^2(\xi - 1 - W(x_4))x_4 x_1^2 - 6\alpha^2 bx_4 x_1 x_2 - \alpha\beta x_2 - 6\alpha\beta x_1^3 + \alpha\gamma x_3 + \alpha\{\alpha\{\xi - 1 - W(x_4) - 1\}\}\{x_1 - x_2 + x_3\};$$
(20)

and $\omega(z) = \omega(\Phi^{-1}(z))$. The following assumptions are used.

Assumption 1: The map $\Phi(x)$ and its inverse $\Phi^{-1}(z)$ are uniformly Lipschitz in a compact set $\mathcal{D} \subset \mathbb{R}^4$, and in $\mathbb{R}_z \equiv \Phi(\mathcal{D})$, respectively, as a result, there exist positive constants $L_\Phi$ and $L_{\Phi^{-1}}$ such that:

$$\|\Phi(x) - \Phi(\hat{x})\| \leq L_\Phi \|x - \hat{x}\|, \ \forall x \in \mathcal{D}$$
$$\|\Phi^{-1}(z) - \Phi^{-1}(\hat{z})\| \leq L_{\Phi^{-1}} \|z - \hat{z}\|, \ \forall x \in \mathcal{D}_z;$$
(21)

Chaotic systems are bounded in a compact invariant set $\mathcal{D} \subset \mathbb{R}^4$. If the input m(t) is chosen sufficiently small so that the System defined (4) keeps its chaotic behavior, then its solutions $x_i(t)$, i=1, 2, 3, 4 ultimately converge towards an attractive set (strange attractor). An evaluation of the Lipschitz constant $L_\Phi$ can be determined from (17) as follows. Since $$\|\Phi(x) - \Phi(\hat{x})\| = \sqrt{\sum_{i=1}^{4}\|\Phi(x) - \Phi(\hat{x})\|^2}, \text{ then}$$

$$L_\Phi = \sqrt{\sum_{i=1}^{4} L_{\Phi_i}^2}, \text{ where } L_{\Phi_i} = \sup_{x \in D}\left\|\frac{\partial \Phi_i(x)}{\partial(x)}\right\|$$

denotes the Lipschitz constant of $\Phi_i(x)$. The gradient $$\frac{\partial \Phi_i(x)}{\partial(x)}$$

may be obtained from the expression of $\Phi_i(x)$ given by (17). In some examples, constants $L_{\Phi_i}$ are estimated numerically by simulation. The same procedure can be used to evaluate $L_{\Phi^{-1}}$ from (18).

Now, introduce the second coordinates transformation based on the modulating functions as follows:

$$\zeta_1(t) = \alpha_{10}\mu(t)z_1(t)$$
$$\zeta_2(t) = \alpha_{21}\mu^{(1)}(t)z_1(t) + \alpha_{20}\mu(t)z_2(t)$$
$$\zeta_3(t) = \alpha_{32}\mu^{(2)}(t)z_1(t) + \alpha_{31}\mu^{(1)}(t)z_2(t) + \alpha_{30}\mu(t)z_3(t)$$
$$\zeta_4(t) = \alpha_{43}\mu^{(3)}(t)z_1(t) + \alpha_{42}\mu^{(2)}(t)z_2(t) + \alpha_{41}\mu^{(1)}(t)z_3(t) + \alpha_{40}\mu(t)z_4(t);$$
(22)

where $\alpha_{ji}$, $j=\overline{1,4}$, $i=\overline{0,3}$ are constant coefficients such that $\alpha_{j0} \neq 0$, $j=\overline{1,4}$.

The above transformation is provided by:

$$\zeta(t) = T(\mu(t))z(t)$$
(23)

$$T(\mu(t)) = \begin{bmatrix} \alpha_{10}\mu(t) & 0 & 0 & 0 \\ \alpha_{21}\mu^{(1)}(t) & \alpha_{20}\mu(t) & 0 & 0 \\ \alpha_{32}\mu^{(2)}(t) & \alpha_{31}\mu^{(1)}(t) & \alpha_{30}\mu(t) & 0 \\ \alpha_{43}\mu^{(3)}(t) & \alpha_{42}\mu^{(2)}(t) & \alpha_{41}\mu^{(1)}(t) & \alpha_{40}\mu(t) \end{bmatrix};$$

where $\zeta = [\zeta_1 \ \zeta_2 \ \zeta_3 \ \zeta_4]^T$. Following the definition of the 4-th order modulating function $\mu(t)$, it can be observed that the inverse transformation $z(t) = T^{-1}(\mu(t))\zeta(t)$ always exists for all $t > t_0$ and does not exist only for $t = t_0$. Assume that the coefficients $\alpha_{ji}$ satisfy the following relations:

$$\alpha_{21} + \alpha_{20} - \frac{\alpha_{20}}{\alpha_{30}}\alpha_{31} = 0, \ \alpha_{31} + \alpha_{30} - \frac{\alpha_{30}}{\alpha_{40}}\alpha_{41} = 0,$$
$$\alpha_{32} + \alpha_{31} - \frac{\alpha_{30}}{\alpha_{40}}\alpha_{42} = 0, \ \alpha_{43} + \alpha_{42} = 0, \ \alpha_{42} + \alpha_{41} = 0,$$
$$\alpha_{41} + \alpha_{40} = 0;$$
(24)

In a sequel, without loss of generality, a coefficient is given by: $\alpha_{j0} = 1$, $j=\overline{1,4}$. In the $\zeta$-coordinates, the system of (19) takes a following form:

$$\dot{\zeta}_1(t) = \zeta_2(t) + (1 - \alpha_{21})\mu^{(1)}(t)y(t)$$
$$\dot{\zeta}_2(t) = \zeta_3(t) + (\alpha_{21} - \alpha_{32})\mu^{(2)}(t)y(t)$$
$$\dot{\zeta}_3(t) = \zeta_4(t) + (\alpha_{32} - \alpha_{43})\mu^{(3)}(t)y(t)$$
$$\dot{\zeta}_4(t) = \eta(t) + \alpha_{43}\mu^{(4)}(t)y(t);$$
(25)

where $\eta(t) = \mu(t)(\omega(t) + \alpha m(t))$. From the above, initial conditions of variables $\zeta_i$, are forced to zero and therefore are known, i.e., $\zeta(t_0) = 0$. The aforementioned property enables designing an observer with fixed-time convergence. In an aspect, the current approach involves designing a high-gain observer in $\zeta$-coordinates that provides the estimate $\hat{\zeta}$ of the state $\zeta$, and estimating $\hat{x}(t)$ of the original state system x(t) as:

$$\hat{x}(t) = \Phi^{-1}(T^{-1}(\mu(t))\hat{\zeta}(t)), \forall t > t_0;$$
(26)

Since, the matrix $T(\mu(t))$ is not invertible only at $t = t_0$, then, the observer works for $t > t_0$. However, to avoid numerical singularities during the inversion of the matrix $T(\mu(t))$, the unknown input high-gain observer may be activated after a delay that corresponds to an activation time. Otherwise, the observer approach includes considering the term $\eta(t)$, commonly called as a total disturbance, as an additional state variable. Besides, following assumptions are considered.

Assumption 2: The input m(t) and its first derivative are bounded, i.e., $|m(t)| \leq$ $$D_{m0}, \left|\frac{dm(t)}{d(t)}\right| \leq D_{m1} \forall t > t_0.$$

The amplitude of m(t) is sufficiently small so that the chaotic behavior of the memristive system is maintained. The bounding and having a small amplitude for m(t) enables the encryption security.

Assumption 3: The nonlinear function $\omega(x)$ is uniformly Lipschitz in $\mathcal{D} \in \mathbb{R}^4$, i.e. $|\omega(x) - \omega(\hat{x})| \leq L_\omega |x - \hat{x}|$. From the expression of $\omega(x)$ given above, the Lipschitz constant $L_\omega$ is evaluated as $$L_\omega = sup_{x \in D} \left\| \frac{\partial \omega(x)}{\partial (x)} \right\|.$$

An estimate of $L_\omega$ can be obtained by numerical simulations.

Assumption 4: The total disturbance (t) and its first derivative $$\frac{d\eta(t)}{dt}$$

are bounded and given by:

$$|\eta(t)| \leq D_0, \left|\frac{d\eta(t)}{dt}\right| \leq D_1; \quad (27)$$

For many conventional chaotic systems Assumption 4 is generally satisfied because the responses of chaotic systems are continuously differentiable and bounded. This assumption 4 is also valid for the memristor based chaotic system (4). Thus the term $\omega(x)$ is bounded in the compact domain $\mathcal{D} \in \mathbb{R}^4$ in which system trajectories evolve. Furthermore, Assumption 2 is maintained and satisfied for functioning. Also, the Assumption 4 may not appear as a restriction for most of the practical applications. Further, the time derivative of $\eta(t)$ depends on the state x(t), the input m(t) and on $$\frac{dm(t)}{dt}.$$

In addition, the total disturbance $\eta(t)$ is considered as an additional state variable to be estimated. The assumption that the derivative of $\eta(t)$ is bounded, is considered in the extended observers design.

Considering an ideal case of a noiseless or noise-free channel, a main result is given by the following theorem.

Theorem 1: Consider the memristor chaotic system (4) meeting the Assumptions 1-4. A modulating function $\mu(t)$ satisfying conditions of Definition 5 is provided. An assumption is considered that $\mu(t)$ is a strictly increasing function with no zero crossing for $t > t_0$. A predefined activation time $t_a$ is chosen such that the coordinates transformation $T(\mu(t))$ given in (23) is sufficiently far from singularity for $t \geq t_a$. Considering the following extended high-gain observer:

$$\dot{\hat{\zeta}}_1(t) = \hat{\zeta}_2(t) + (1 - \alpha_{21})\mu^{(1)}(t)y(t) + \frac{k_1}{\epsilon}(\zeta_1(t) - \hat{\zeta}_1(t)) \quad (28)$$

$$\dot{\hat{\zeta}}_2(t) = \hat{\zeta}_3(t) + (\alpha_{21} - \alpha_{32})\mu^{(2)}(t)y(t) + \frac{k_2}{\epsilon^2}(\zeta_1(t) - \hat{\zeta}_1(t))$$

$$\dot{\hat{\zeta}}_3(t) = \hat{\zeta}_4(t) + (\alpha_{32} - \alpha_{43})\mu^{(3)}(t)y(t) + \frac{k_3}{\epsilon^3}(\zeta_1(t) - \hat{\zeta}_1(t));$$

$$\dot{\hat{\zeta}}_4(t) = \hat{\eta} + \alpha_{43}\mu^{(4)}(t)y(t) + \frac{k_4}{\epsilon^4}(\zeta_1(t) - \hat{\zeta}_1(t))$$

$$\dot{\hat{\eta}}(t) = \frac{k_5}{\epsilon^5}(\zeta_1(t) - \hat{\zeta}_1(t))$$

$$\hat{x}(t) = \begin{cases} 0, & t_0 < t < t_a \\ \Phi^{-1}(T^{-1}(\mu(t))\hat{\zeta}(t)), & t \geq t_a \end{cases} ; \quad (29)$$

$$\hat{m}(t) = \begin{cases} 0, & t_0 < t < t_a \\ \frac{1}{\alpha}\left(\frac{1}{\mu(t)}\hat{\eta}(t) - \omega(\hat{x}(t))\right), & t \geq t_a \end{cases} ; \quad (30)$$

where $\hat{\zeta}(t) = [\hat{\zeta}_1(t) \ \hat{\zeta}_2(t) \ \hat{\zeta}_3(t) \ \hat{\zeta}_4(t)]^T$. The initial conditions of (28) are fixed to zero, i.e., $\hat{\zeta}_i(t_0) = 0$, $i = \overline{1,4}$ and $\eta(t_0) = 0$. The observer gains $k_i$, $i = \overline{1,5}$ are selected such that the polynomial is Hurwitz and is given by:

$$s^5 + k_1 s^5 + k_2 s^3 + k_3 s^2 + k_4 s + k_5. \quad (31)$$

There exist $\epsilon^* \in (0 \ 1]$ and some positive constants $\rho_x > 0$, $\rho_m > 0$, such that for $0 < \epsilon < \epsilon^*$, the estimation errors $e_x(t) = x(t) - \hat{x}(t)$, and $e_m(t) = m(t) - \hat{m}(t)$ provided by the extended high-gain observer are immediately bounded in the predefined time $t_a$, that is:

$$\|e_x(t)\| \leq \epsilon^2 \rho_x, \ \forall t > t_a$$

$$|e_m(t)| \leq \epsilon \rho_m, \ \forall t > t_a; \quad (32)$$

The estimation error obtained by classical conventional high-gain observer, is ultimate bounded. In contrast, the estimation error obtained by the fixed-time extended high-gain observer of the disclosure is immediately bounded after the activation time $t_a$. In other words, the fixed-time extended high-gain observer acts as a deadbeat observer. State variables are estimated with an error bounded by $\epsilon^2 \rho_x$. By Definition 4, System as described in (4) and the fixed-time extended high-gain observer are Ex predefined-time synchronized with the settling time $t_a$ where $\epsilon_x = \epsilon^2 \rho_x$.

In the synchronization schemes based on the master-slave configuration, the presence of noise generated by the transmission channel is natural and expected. This noise affects the performance of the observer and can obliterate the synchronization process. The major drawback of the high-gain observer is its sensitivity to noise. Even if the conventional standard high-gain observer has to be Input State Stable (ISS) with respect to measurement noise, the estimation error due the noise w(t) is proportional to $$\frac{1}{\epsilon^{n-1}} sup_{t \geq 0} |w(t)|.$$

So, a small value needed to attenuate the uncertainties and external disturbances yields to large estimation errors. A filtered high-gain observer design is disclosed to improve robustness of the observer against output measurement noise. The high-gain observer design is based on the implementation of two cascade n-dimensional systems. Further, a filtered fixed-time extended high-gain observer is described in the disclosure. An assumption is made that the transmitted output is corrupted by an additive noise signal that is $y_m(t) = y(t) + w(t)$.

Assumption 5: The noise signal w(t) is bounded, $|w(t)| \leq D_w$.

The proposed new filtered fixed-time extended high-gain observer is given by the following theorem.

Theorem 2: Consider the memristor chaotic system (4) meeting the Assumptions 1-5. A modulating function μ(t) satisfying conditions of Definition 5 is provided. An assumption is considered that μ(t) is a strictly increasing function with no zero crossing for t>$t_0$. A predefined activation time $t_a$ is chosen such that the coordinates transformation T(μ(t)) given in (23) is sufficiently far from singularity for t≥$t_a$. Consider the following filtered extended high-gain observer.

$$\dot{\hat{\zeta}}_1(t) = \hat{\zeta}_2(t) + (1 - \alpha_{21})\mu^{(1)}(t)y_m(t) + L_1\kappa_1(t) \quad (33)$$
$$\dot{\hat{\zeta}}_2(t) = \hat{\zeta}_3(t) + (\alpha_{21} - \alpha_{32})\mu^{(2)}(t)y_m(t) + L_2\kappa_2(t)$$
$$\dot{\hat{\zeta}}_3(t) = \hat{\zeta}_4(t) + (\alpha_{32} - \alpha_{43})\mu^{(3)}(t)y_m(t) + L_3\kappa_3(t);$$
$$\dot{\hat{\zeta}}_4(t) = \hat{\eta}(t) + \alpha_{43}\mu^{(4)}(t)y_m(t) + L_4\kappa_4(t)$$
$$\dot{\hat{\eta}}(t) = L_5\kappa_5(t)$$
$$\dot{\kappa}_1(t) = -k\sigma_1\kappa_1(t) + k^2\sigma_2(\mu y_m(t) - \hat{\zeta}_1(t))$$
$$\dot{\kappa}_2(t) = -k\sigma_1\kappa_2(t) + k^2\sigma_2\kappa_1(t)$$
$$\dot{\kappa}_3(t) = -k\sigma_1\kappa_3(t) + k^2\sigma_2\kappa_2(t)$$
$$\dot{\kappa}_4(t) = -k\sigma_1\kappa_4(t) + k^2\sigma_2\kappa_3(t)$$
$$\dot{\kappa}_5(t) = -k\sigma_1\kappa_5(t) + k^2\sigma_2\kappa_4(t)$$

$$\hat{x}(t) = \begin{cases} 0, & t_0 < t < t_a \\ \Phi^{-1}(T^{-1}(\mu(t))\hat{\zeta}(t)), & t \geq t_a \end{cases} ; \quad (34)$$

$$\hat{m}(t) = \begin{cases} 0, & t_0 < t < t_a \\ \frac{1}{\alpha}\left(\frac{1}{\mu(t)}\hat{\eta}(t) - \omega(\hat{x}(t))\right), & t \geq t_a \end{cases} ; \quad (35)$$

where $\hat{\zeta}(t) = [\hat{\zeta}_1(t) \; \hat{\zeta}_2(t) \; \hat{\zeta}_3(t) \; \hat{\zeta}_4(t)]^T$. The initial conditions of (33) are fixed to zero, i.e., $\hat{\zeta}_i(t_0)=0$, $i=\overline{1,4}$ and $\hat{\eta}(t_0)=0$ and $\kappa_i(t_0)=0$, $i=\overline{1,5}$. The observer gains $L_i$, $i=\overline{1,5}$ are selected such that the matrix (A−LC) is Hurwitz, where L=$[L_1 \; L_2 \; L_3 \; L_4 \; L_5]^T$, every eigenvalue $\lambda_i$ of (A−LC) satisfies the sector inclusion $\sigma_1^2 X_i + \sigma_1^2 Y_i^2 < 0$, where $X_i$ and $Y_i$ denote the real and imaginary parts of $\lambda_i$, respectively, for some fixed real positive constants $\sigma_i$ and $\sigma_2$. There exists k*>0 and some positive constants $\tilde{\rho}_{x1}>0$, $\tilde{\rho}_{x2}>0$, $\tilde{\rho}_{m1}>0$, $\tilde{\rho}_{m2}>0$ such that for k>k*, the estimation errors $e_x(t)=x(t)-\hat{x}(t)$, and $e_m(t)=m(t)-\hat{m}(t)$ provided by the filtered extended high-gain observer are immediately bounded in the predefined time $t_a$, that is:

$$\|e_x(t)\| \leq \tilde{\rho}_{x1}D_w + \tilde{\rho}_{x2}D_1, \; \forall t > t_a$$

$$|e_m(t)| \leq \tilde{\rho}_{m1}D_w + \tilde{\rho}_{m2}D_1, \; t > t_a; \quad (36)$$

According to the definition of the modulating function μ(t), the derivatives $\mu^j(t)$, j=1, 2, . . . tend towards zero as t goes to infinity while μ(t) asymptotically tends to a constant. More precisely, after the activation time $t_a$, the derivatives of the modulating function become very small. Furthermore, the parameter k is chosen sufficiently large, (k>>1). In other words, only the dominant multiplicative term of the noise in $\mathbb{B}_N$ is $k\sigma_2\mu(t)$ can be made small by an adequate choice of the parameter $\sigma_2$. Increasing the gain k enables reduction of the influence of the total disturbance η(t). In the presence of noise, the steady state estimation error provided by the unfiltered standard high-gain observer is proportional to $$\left(\frac{1}{\epsilon}\right)^4 sup_{t \geq t_0} |w(t)|.$$

In this case, there is no means for simultaneously attenuating the effect of noise and that of the total disturbance. On the other hand, the filtered observer offers a way to assure an adjustable bounded estimation error in the presence of both noise and total disturbance. This is possible by properly adjusting the observer gains, k, $\sigma_1$, and $\sigma_2$.

In an aspect, the secure chaos-based encryption-decryption protocol in the noisy channel case is summarized by the following steps. For the noise free channel case, the fixed-time filtered extended high-gain observer is replaced by a fixed-time extended high-gain observer with appropriate parameters in the following steps. Otherwise, the procedure is the same for both cases.

Encryption Steps (Emitter Side)

Step 1: Given the secrete message m(t) and all parameters α, β, γ, ξ, a, b of the memristor chaotic system (4) with initial condition, $x_i(t_0)$, i=1, 2, 3, 4.

Step 2: Solve the memristor based chaotic system (4) with the Runge-Kutta method with a sampling step h. Runge-Kutta method is a technique for solving initial value problems of differential equations.

Step 3: Generate the encryption signal y(t)=$x_4(t)$.

Step 4: Send y(t) through the public channel.

Decryption Steps (Receiver Side)

Step 1: Select the modulating function (t) and the coefficients $\alpha_{ji}$, j=$\overline{1,4}$, i=$\overline{0,3}$ satisfying equations (24).

Step 2: Selection of the observer parameters: Choose any $\sigma_1$, $\sigma_2$>0. Choose stable poles $\lambda_{ji}$, i=$\overline{1,5}$ of (A−LC). Determine the gain L by pole-placement procedure. Choose the gain k>>1.

Step 3: Initialize the values of $\hat{\zeta}_i(t_0)$ and $\kappa_i(t_0)$=0, i=$\overline{1,5}$ to zero.

Step 4: Once the measurement $y_m(t)$ is received, solve the filtered fixed-time extended high-gain observer (33) by the Runge-Kutta method with the sampling step h.

Step 5: Compute $\hat{x}(t)$ and $\hat{m}(t)$ by (34) and (35), respectively. Runge-Kutta method with the sampling step h (or referred to as fourth-order Runge-Kutta method) is given by:

$$y_{i+1} = y_i + \frac{1}{6}(k_1 + 2k_2 + 2k_3 + k_4), \quad (A)$$

where:

$$k_1 = hf(x_i, y_i) \quad (B)$$
$$k_2 = hf\left(x_i + \frac{h}{2}, y_i + \frac{k_1}{2}\right)$$
$$k_3 = hf\left(x_i + \frac{h}{2}, y_i + \frac{k_2}{2}\right);$$
$$k_4 = hf(x_i + h, y_i + k_3)$$

Figure 4:
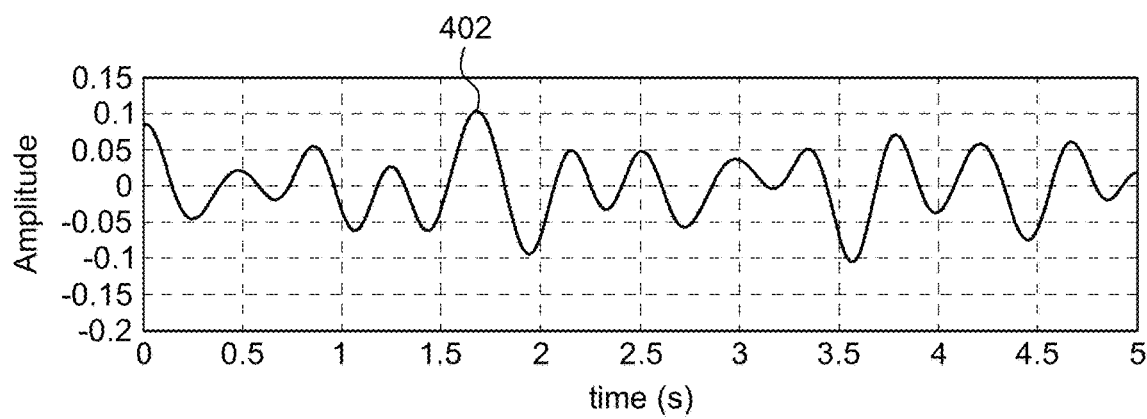
FIG. 4 is a plot illustrating an original message, according to certain embodiments.

Preliminary Results:

All numerical simulations are carried out using the fourth-order Runge-Kutta method with adaptive step size. The initial time is set to zero, $t_0$=0. In an example, the secret message signal m(t) is taken as m(t)=$\sum_{j=1}^{6} a_i \cos(\omega_i t + \theta_i)$ with ($a_1$, $\omega_1$, $\theta_1$)=(0.01, 5, 4), ($a_{i2}$, $\omega_2$, $\theta_2$)=(0.03, 8, 6), ($a_3$, $\omega_3$, $\theta_3$)=(0.01, 10, 8), ($a_4$, $\omega_4$, $\theta_4$)=(0.02, 12, 5), ($a_5$, $\omega_5$, $\theta_5$)=(0.05, 15, 6), ($a_6$, $\omega_6$, $\theta_6$)=(0.01, 20, 7). This m(t) signal is plotted in FIG. 4 and shown as 402. The modulating function is chosen as μ(t)=$A_\mu(1-e^{-\lambda t})^4$ with $A_\mu$=1 and λ=1. The parameters $\alpha_{j0}$ $j=\overline{1,4}$ are all selected equal to 1. From equation (24), the other parameters are computed and obtained as $\alpha_{21}=-3$, $\alpha_{31}=-2$, $\alpha_{32}=3$, $\alpha_{41}=-1$, $\alpha_{42}=1$ and $\alpha_{43}=-1$.

Figure 5A:
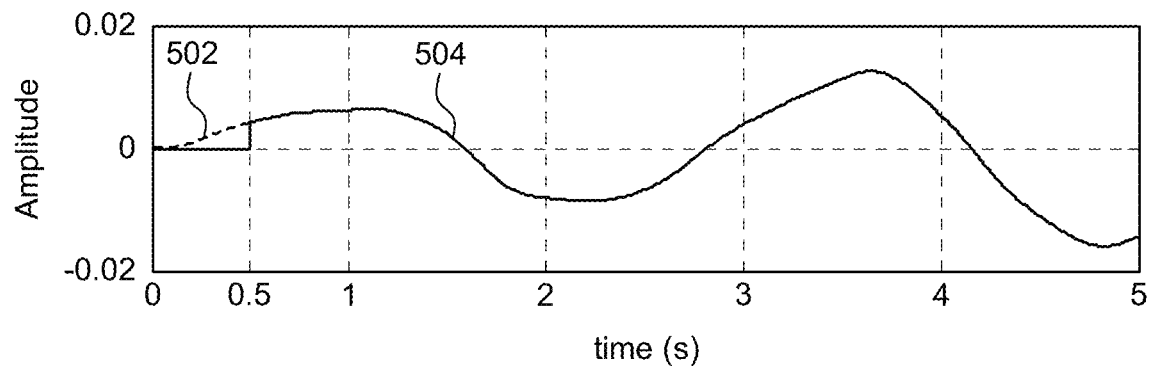
FIG. 5A is a plot illustrating a synchronization state of a drive system and a state of a response system for a noise free case, according to certain embodiments.
Figure 5B:
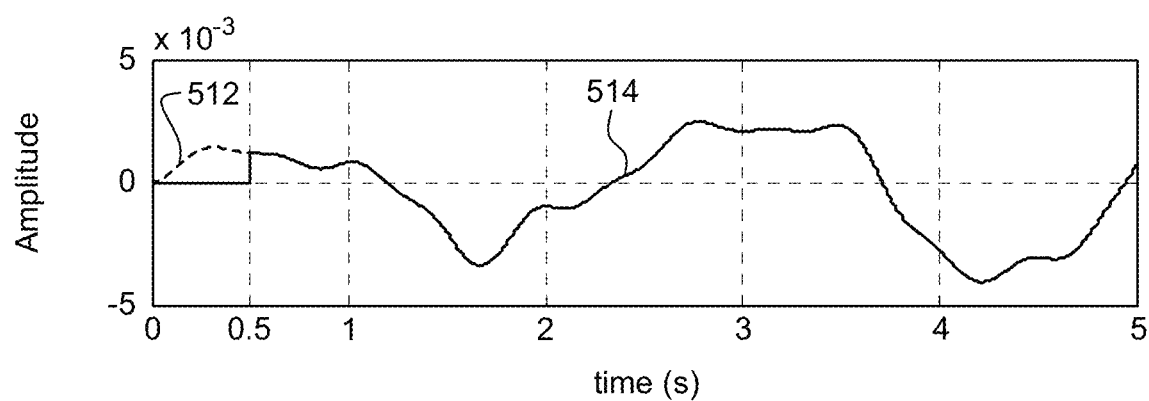
FIG. 5B is another plot illustrating a synchronization state of the drive system and a state of a response system for the noise free case, according to certain embodiments.
Figure 5C:
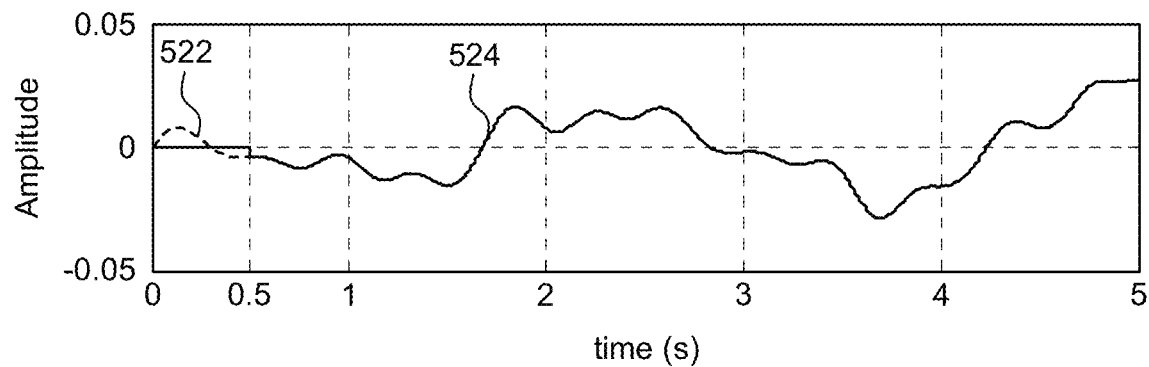
FIG. 5C is another plot illustrating a synchronization state of the drive system and a state of the response system for the noise free case, according to certain embodiments.
Figure 5D:
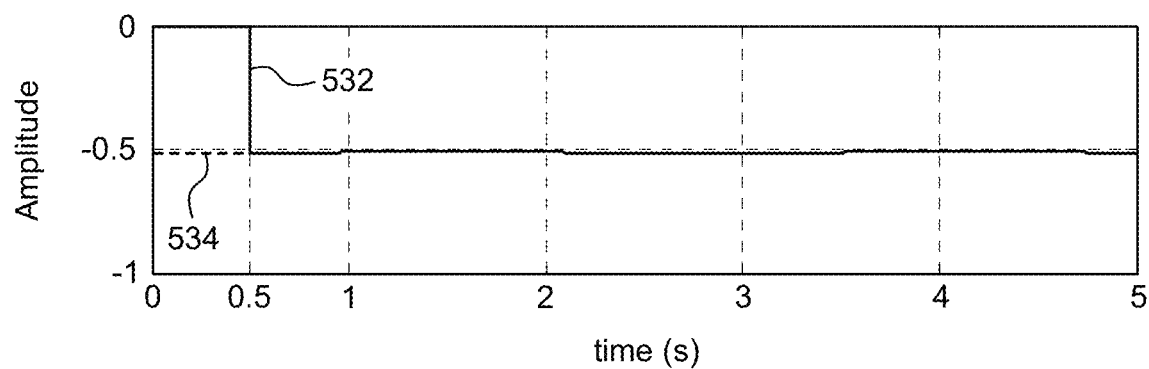
FIG. 5D is another plot illustrating a synchronization state of the drive system and a state of the response system for the noise free case, according to certain embodiments.

Noise Free Case:

The initial conditions of the drive (master) system are $x(0)=[10^{-10}\ 0\ 0\ -0.515]^T$ while those of the response (slave) system are set at zero. The activation time is fixed as $t_a=0.5$ s. The zeros of the polynomial (31) are chosen all equal to $-1$ which implies that $k_1=k_4=5$, $k_2=k_3=10$, $k_5=1$. The parameter $\epsilon$ is chosen as $\epsilon=0.001$. The synchronization of the state $x(t)$ of a drive system and the state $\hat{x}(t)$ of the response system is depicted in FIGS. 5A-5D. FIG. 5A illustrates a synchronization state $(x_1, \hat{x}_1)$ for $t_a=0.5$ s, with an original state 502 and an estimated state 504 based on method of the disclosure. FIG. 5B illustrates a synchronization state $(x_2, \hat{x}_2)$ for $t_a=0.5$ s, with an original state 512 and an estimated state 514 based on method of the disclosure. FIG. 5C illustrates a synchronization state $(x_3, \hat{x}_3)$ for $t_a=0.5$ s, with an original state 522 and an estimated state 524 based on method of the disclosure. FIG. 5D illustrates a synchronization state $(x_4, \hat{x}_4)$ for $t_a=0.5$ s, with an original state 532 and an estimated state 534 based on method of the disclosure.

Figure 6A:
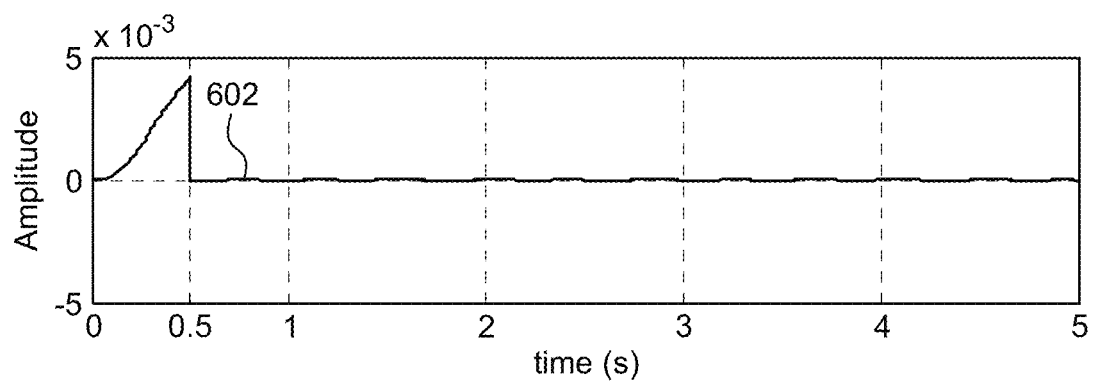
FIG. 6A is a plot illustrating a time behavior of estimation errors in a noise free case, according to certain embodiments.
Figure 6B:
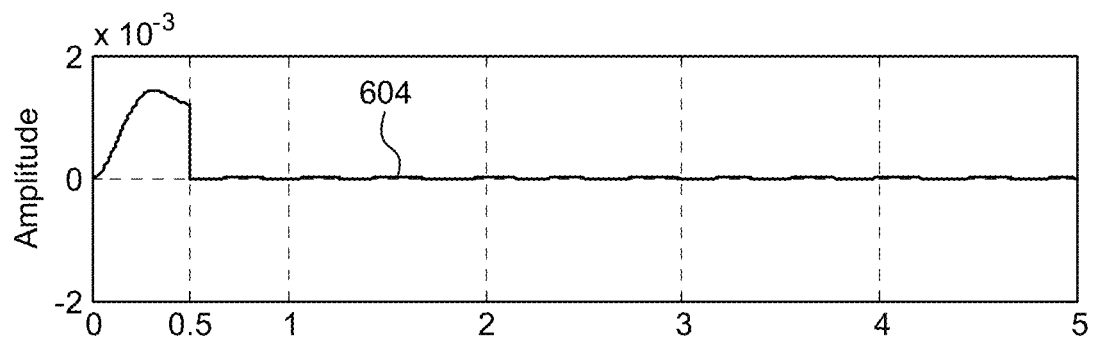
FIG. 6B is another plot illustrating a time behavior of the estimation errors in the noise free case, according to certain embodiments.
Figure 6C:
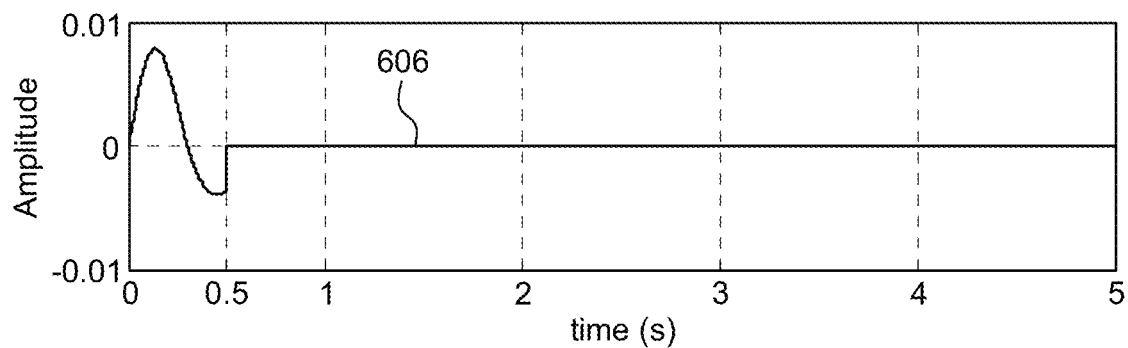
FIG. 6C is another plot illustrating a time behavior of the estimation errors in the noise free case, according to certain embodiments.
Figure 6D:
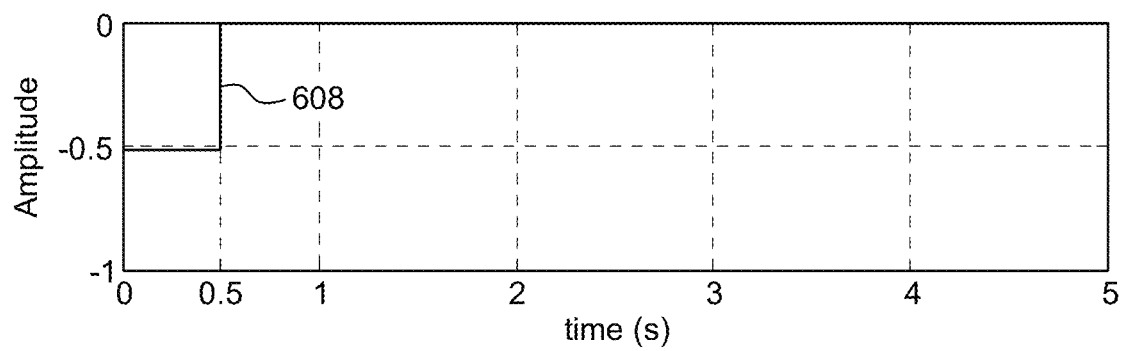
FIG. 6D is another plot illustrating a time behavior of the estimation errors in the noise free case, according to certain embodiments.

FIGS. 6A-6D show the time behavior of the estimation errors $e_i(t)=x_i(t)-\hat{x}_i(t)$, $i=1, 4$ for $t_a=0.5$ s. FIG. 6A illustrates a time behavior of estimation error $e_1=x_1-\hat{x}_1$ given by 602. FIG. 6B illustrates a time behavior of estimation error $e_2=x_2-\hat{x}_2$ given by 604. FIG. 6C illustrates a time behavior of estimation error $e_3=x_3-\hat{x}_3$ given by 606. FIG. 6D illustrates a time behavior of estimation error $e_4=x_4-\hat{x}_4$ given by 608. FIGS. 5A-5D and FIGS. 6A-6D illustrate that the synchronization is achieved in fixed-time, almost instantaneously at the activation time $t_a$. The trajectories of the estimated state variables reach those of the real state variables instantaneously at time $t_a$ without any transient. The selling time is then equal to the activation time $t_a$ which is chosen in advance independently of initial conditions.

Figure 7:
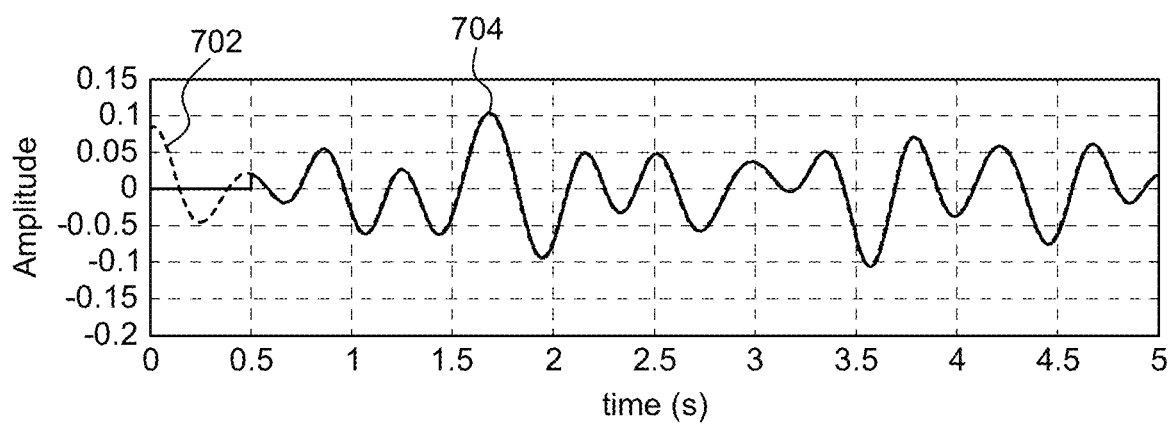
FIG. 7 is a plot illustrating an original message and a restored in the noise free case, according to certain embodiments.
Figure 8:
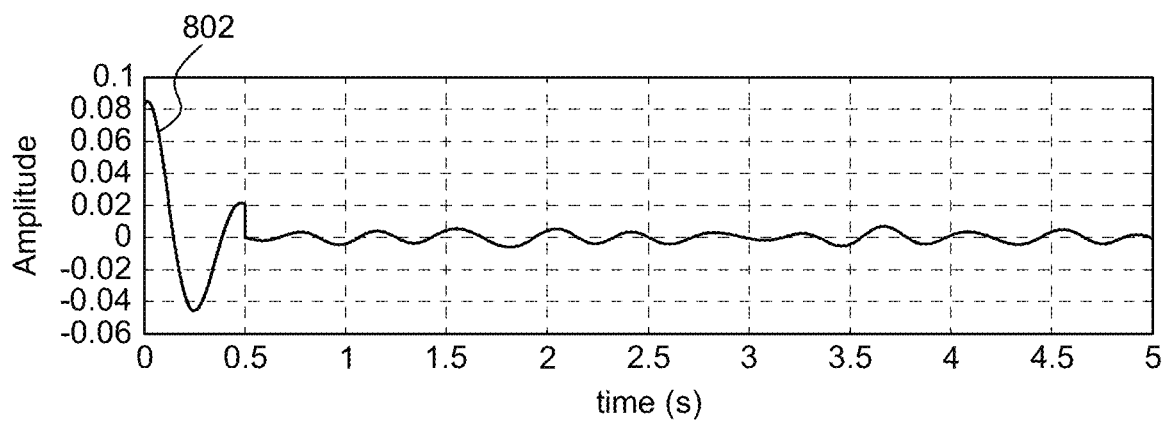
FIG. 8 is a plot illustrating a time history of estimating error, according to certain embodiments.
Figure 9A:
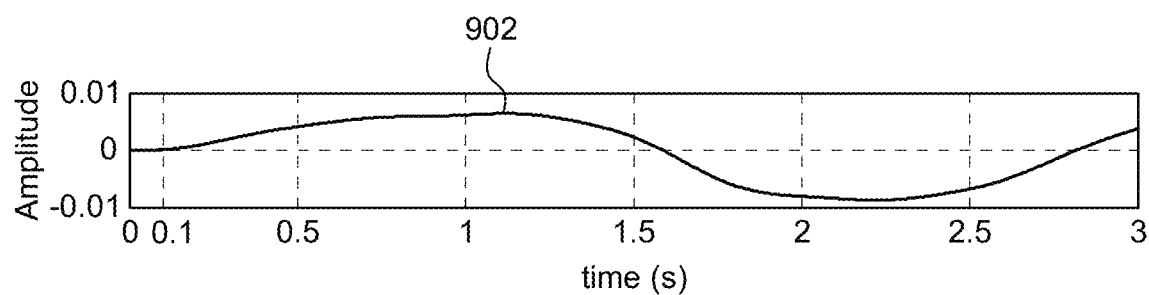
FIG. 9A is a plot illustrating a simulation of a synchronization state in the noise free case, according to certain embodiments.
Figure 9B:
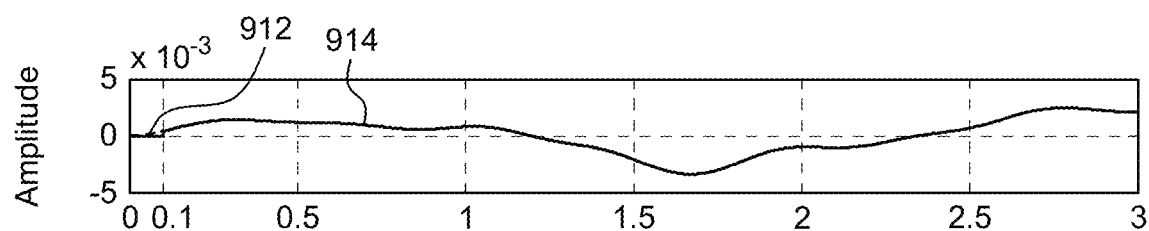
FIG. 9B is another plot illustrating a simulation result of the synchronization state in the noise free case, according to certain embodiments.
Figure 10A:
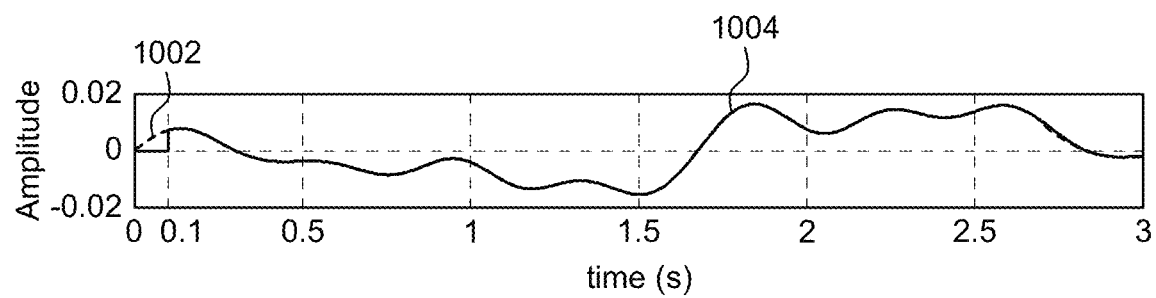
FIG. 10 is another plot illustrating a simulation of the synchronization state in the noise free case, according to certain embodiments.
Figure 10B:
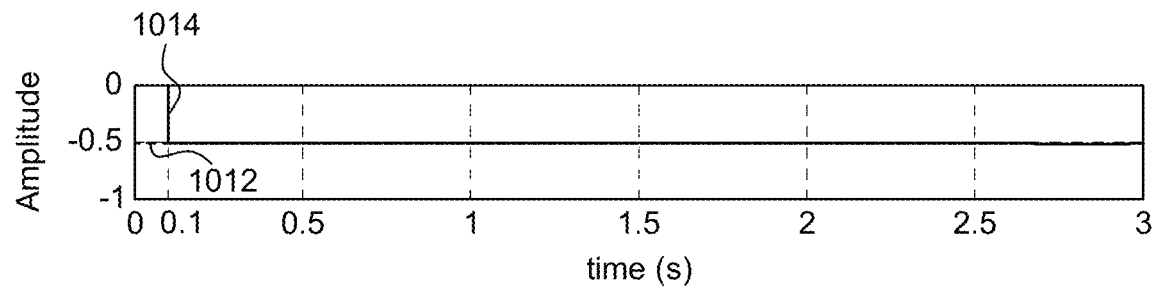
Figure 11:
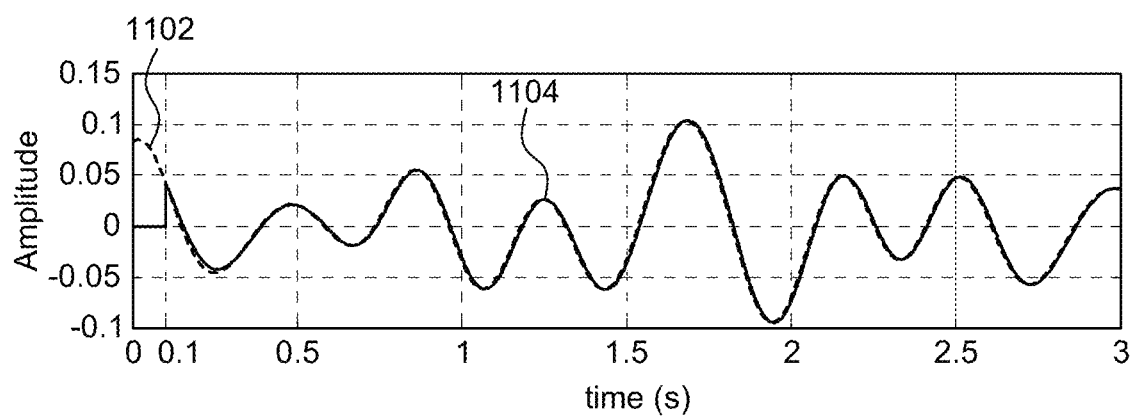
FIG. 11 is another plot illustrating a simulation of a message reconstruction in the noise free case, according to certain embodiments.

FIG. 7 shows a plotted original message m(t) 702 and the restored message $\hat{m}(t)$ 704 for $t_a=0.5$ s. FIG. 8 shows a time history of the estimation error (t)−$\hat{m}$(t) $t_a=0.5$ s. The secret message is well recovered with reasonable accuracy by the receiver in fixed-time. The Root Relative Squared Error accumulated over all computed samples is $$\epsilon_{RRSE} = \frac{1}{N}\sqrt{\frac{\sum_{j=0}^{N}(m(jh)-\hat{m}(jh))^2}{\sum_{j=0}^{N}m(jh)^2}} = 6.1201\times 10^{-5},$$

where N denotes the number of samples. This small error value means that the decrypted signal is substantially proximate to the original signal. The activation time may be arbitrary chosen to be sufficiently small. The only condition which the choice of the activation time $t_a$ is to avoid numerical singularities in the inversion of the matrix $T(\mu(t))$. Simulation results for short activation time, namely $t_a=0.1$ s, are illustrated in FIGS. 9A, 9B, FIGS. 10A, 10B and FIG. 11 in which the estimated state variables and the recovered message are depicted, respectively. FIG. 9A illustrates a synchronization state $(x_1, \hat{x}_1)$ for $t_a=0.1$ s, with an original state 902 and an estimated state 904 based on method of the disclosure. FIG. 9B illustrates a synchronization state $(x_2, \hat{x}_2)$ for $t_a=0.1$ s, with an original state 912 and an estimated state 914 based on method of the disclosure. FIG. 10A illustrates a synchronization state $(x_3, \hat{x}_3)$ for $t_a=0.1$ s, with an original state 1002 and an estimated state 1004 based on method of the disclosure. FIG. 10B illustrates a synchronization state $(x_4, \hat{x}_4)$ for $t_a=0.1$ s, with an original state 912 and an estimated state 914 based on method of the disclosure. FIG. 11 shows a message reconstruction plot with original message m(t) 1102 and the restored message $\hat{m}(t)$ 1104 for $t_a=0.1$ s. The Figures demonstrate that the synchronization as well as the reconstruction of the message are successfully carried out for short activation time.

Figure 12A:
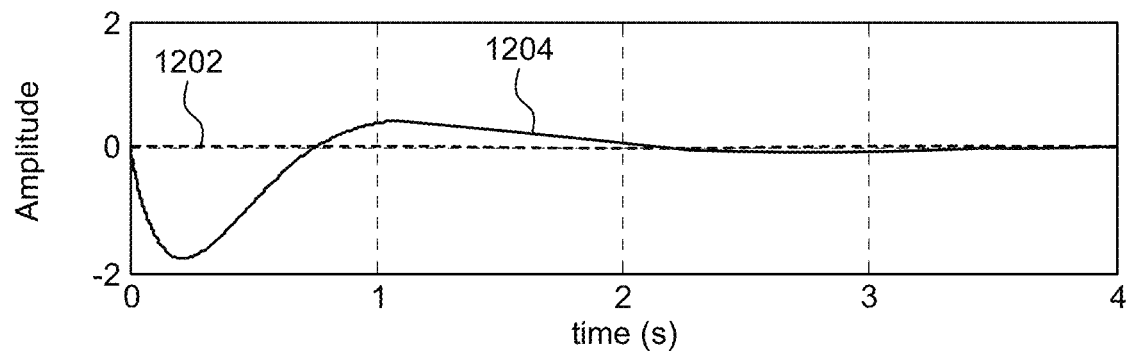
FIG. 12A is a plot illustrating results obtained by a conventional extended high-gain observer, according to certain embodiments.
Figure 12B:
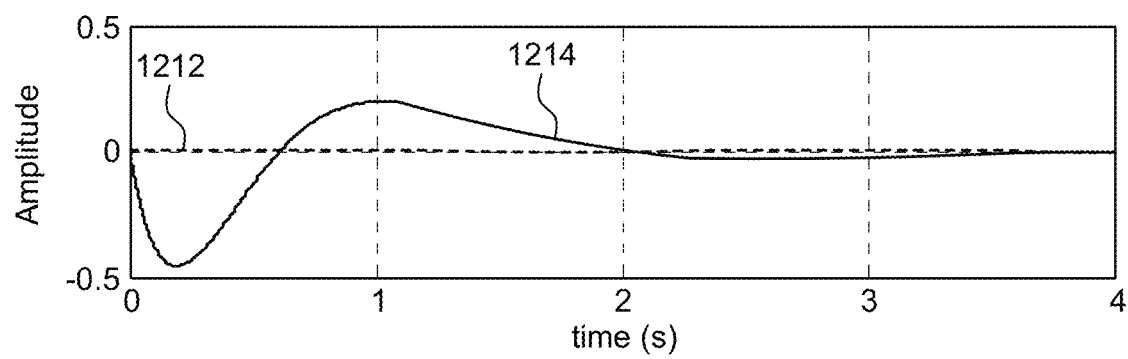
FIG. 12B is another plot illustrating results obtained by the conventional extended high-gain observer, according to certain embodiments.
Figure 12C:
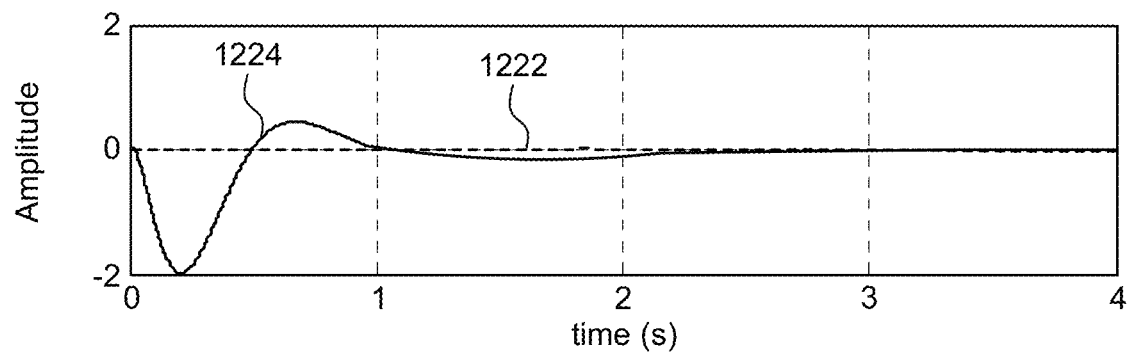
FIG. 12C is another plot illustrating results obtained by the conventional extended high-gain observer, according to certain embodiments.
Figure 12D:
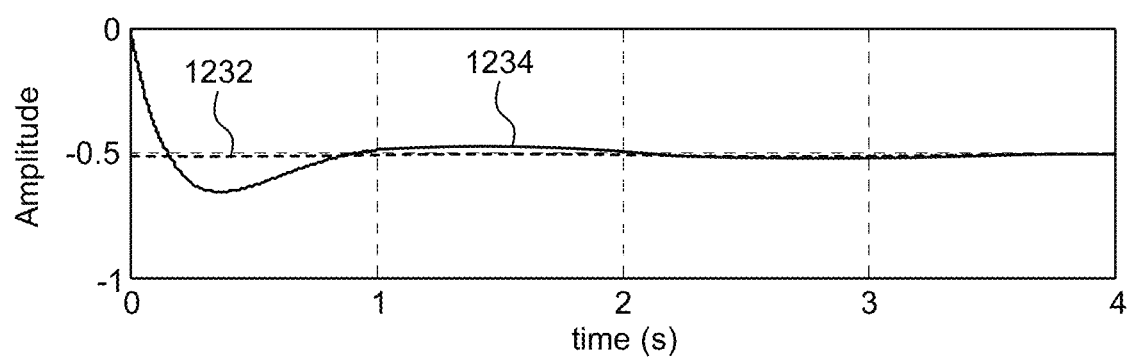
FIG. 12D is another plot illustrating results obtained by the conventional extended high-gain observer, according to certain embodiments.
Figure 13:
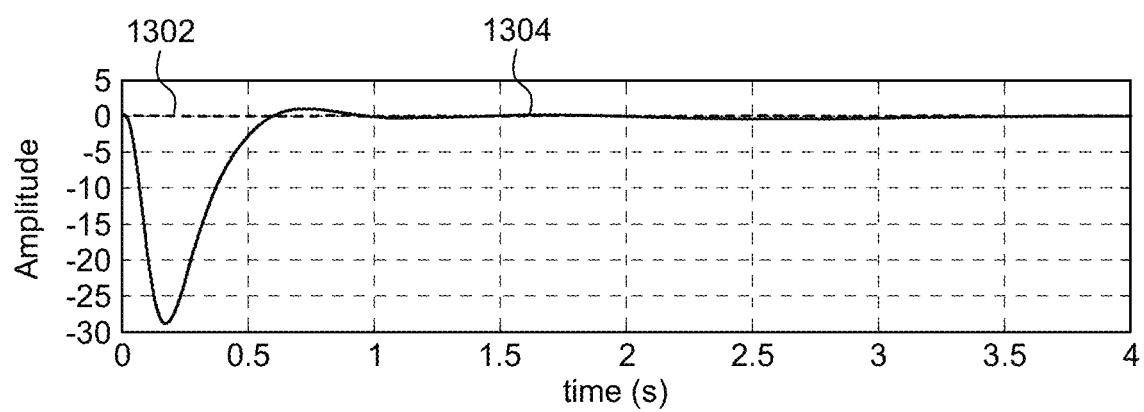
FIG. 13 is a plot illustrating message reconstruction obtained by the conventional extended high-gain observer, according to certain embodiments.

To highlight the efficiency of the observer of the disclosure, FIGS. 12A-12D and FIG. 13 are shown with the results obtained by the conventional extended high-gain observer with the same values of $k_i$, $i=\overline{1,5}$ and $\epsilon$. This conventional high-gain inevitably produces a slow asymptotic convergence with a degraded transient and transient peaks phenomenon. The increase in gains in order to have good speed and good precision leads to a high transient peaks phenomenon. Obtaining rapid convergence with good precision without revealing transient peaks phenomena is a dilemma which is difficult to be satisfied with the conventional high-gain observer. FIGS. 12A-12D and FIG. 13 demonstrate that the observer of the disclosure provides better results. FIG. 12A illustrates a synchronization state $(x_1, \hat{x}_1)$, with an original state 1202 and an estimated state 1204 based on a classical high-gain observer. FIG. 12B illustrates a synchronization state $(x_2, \hat{x}_2)$ with an original state 1212 and an estimated state 1214 based on the classical high-gain observer. FIG. 12C illustrates a synchronization state $(x_3, \hat{x}_3)$ with an original state 1222 and an estimated state 1224 based on the classical high-gain observer. FIG. 12D illustrates a synchronization state $(x_4, \hat{x}_4)$ with an original state 1232 and an estimated state 1234 based on the classical high-gain observer. FIG. 13 shows a message reconstruction of message m(t) 1302 and the restored message $\hat{m}(t)$ 1304, via classical high-gain observer original.

Figure 14A:
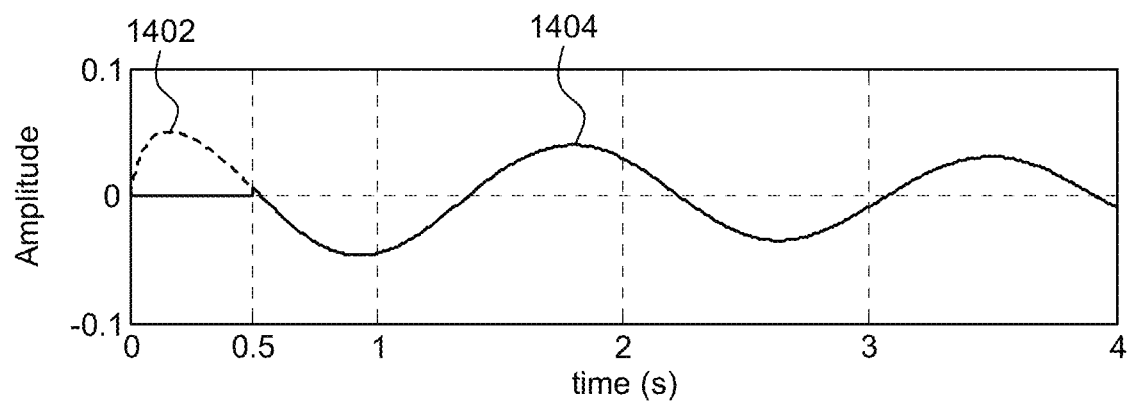
FIG. 14A is a plot illustrating a synchronization state achieved by observer of the disclosure, according to certain embodiments.
Figure 14B:
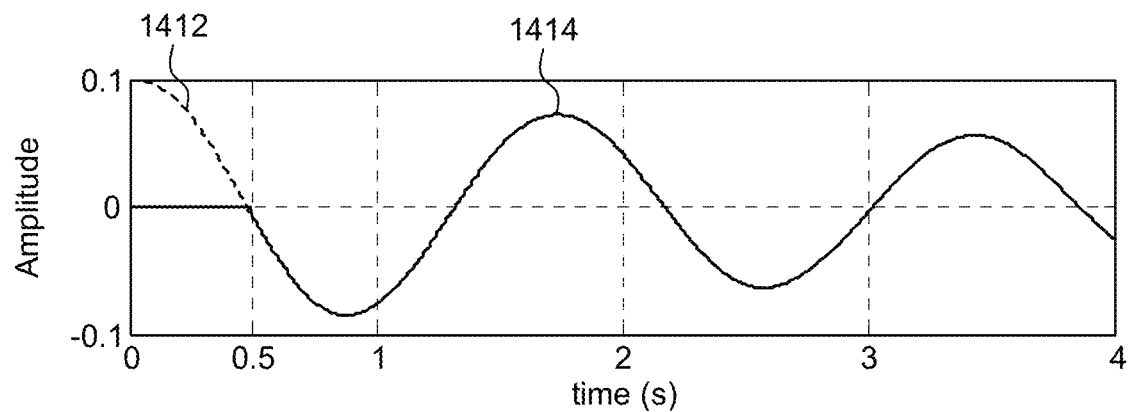
FIG. 14B is another plot illustrating the synchronization state achieved by observer of the disclosure, according to certain embodiments.
Figure 14C:
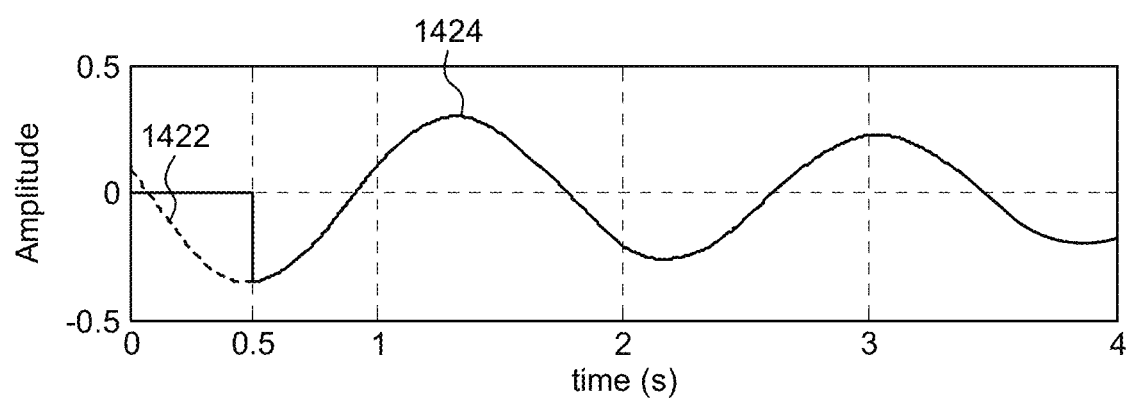
FIG. 14C is another plot illustrating the synchronization state achieved by observer of the disclosure, according to certain embodiments.
Figure 14D:
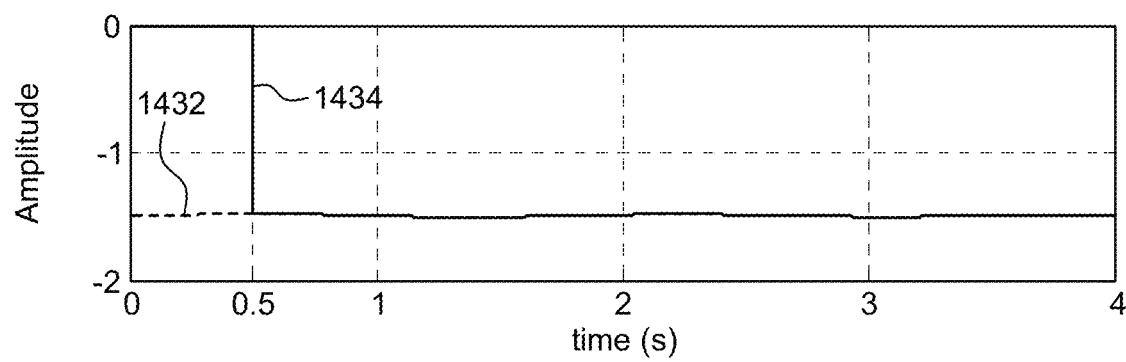
FIG. 14D is another plot illustrating the synchronization state achieved by observer of the disclosure, according to certain embodiments.
Figure 15:
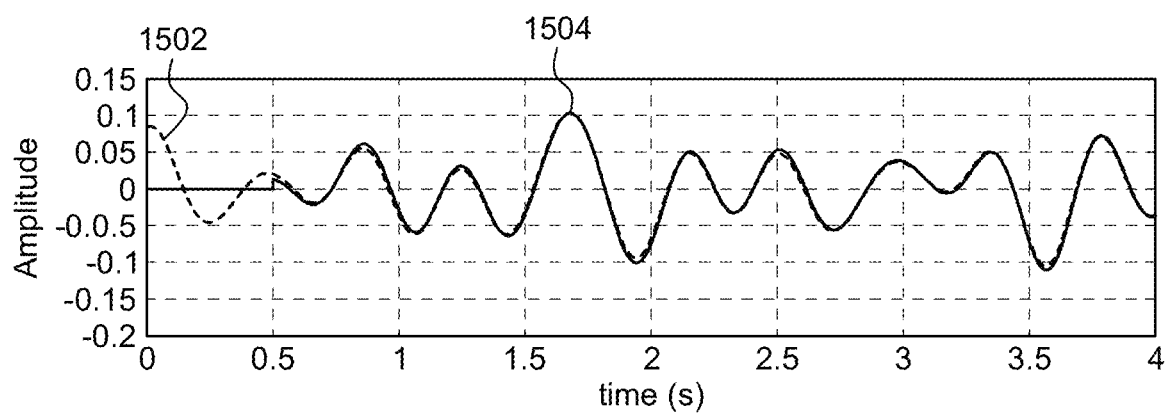
FIG. 15 is a plot illustrating a message reconstruction achieved by observer of the disclosure, according to certain embodiments.

The synchronization achieved by the observer of the disclosure is almost instantaneous without the presence of transient response, whatever the initial estimation errors are relatively large as depicted in FIGS. 14A-14D and FIG. 15 for $t_a=0.1$ s, $\epsilon=0.005$, and $x(0)=[10^{-6}\ 0.1\ 0.1\ -1.5]^T$. FIG. 14A illustrates a synchronization state $(x_1, \hat{x}_1)$, with an original state 1402 and an estimated state 1404. FIG. 14B illustrates a synchronization state $(x_2, \hat{x}_2)$ with an original state 1412 and an estimated state 1414. FIG. 14C illustrates a synchronization state $(x_3, \hat{x}_3)$ with an original state 1422 and an estimated state 1424. FIG. 14D illustrates a synchronization state $(x_4, \hat{x}_4)$ with an original state 1432 and an estimated state 1434. The use of modulating function based coordinates transformation enables discarding the effect of initial conditions on the settling time. The observer of the disclosure recovers the message after the delay $t_a$. In order to avoid any information loss, the confidential message may include a buffer or a no-meaning information before the activation time $t_a$. FIG. 15 shows a message reconstruction of message m(t) 1502 and the restored message $\hat{m}(t)$ 1504.

Figure 16A:
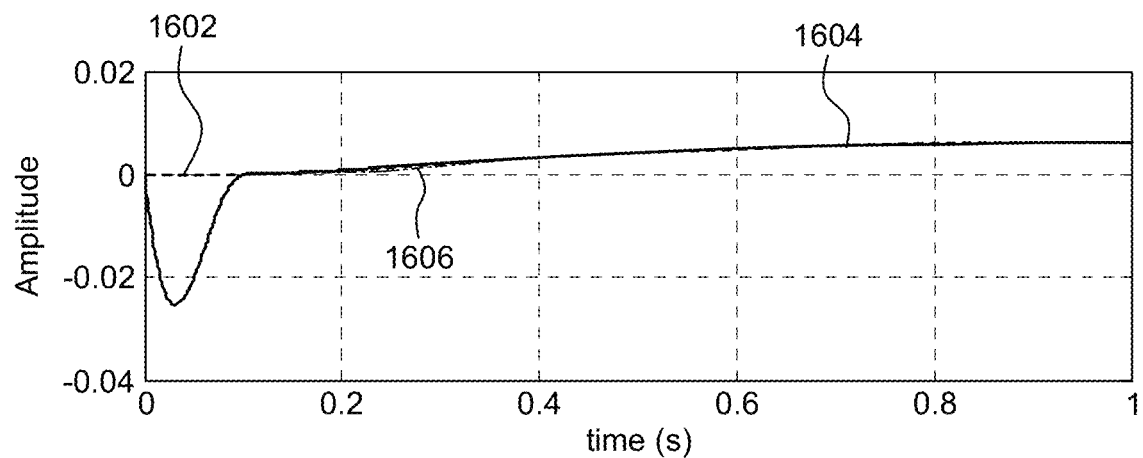
FIG. 16A is a plot illustrating a comparison of synchronization results of disclosed predefined-time synchronization method with a predefined-time synchronization approach of Active Control Lyapunov Function (ACLF), according to certain embodiments.
Figure 16B:
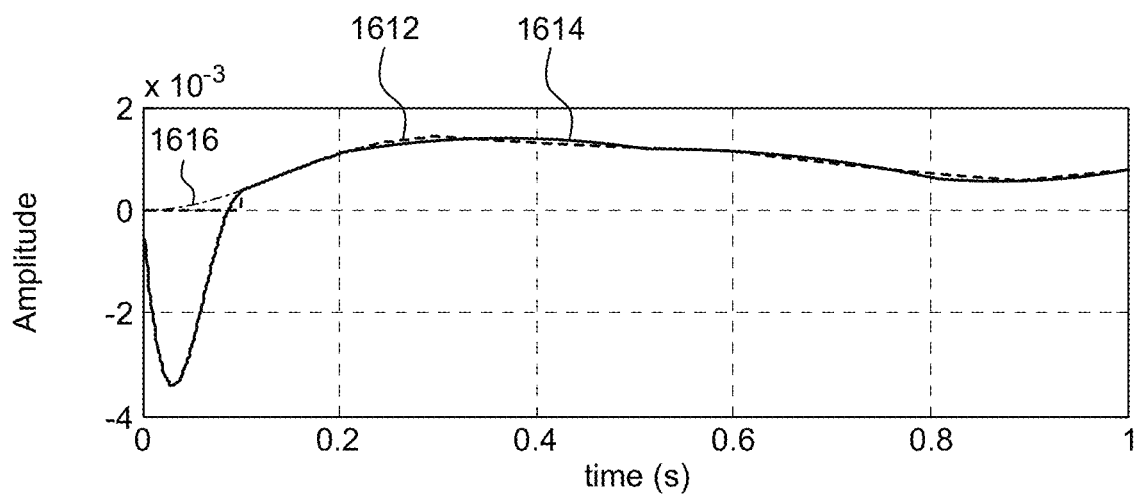
FIG. 16B is another plot illustrating a comparison of synchronization results of disclosed predefined-time synchronization method with a predefined-time synchronization approach of ACLF, according to certain embodiments.
Figure 16C:
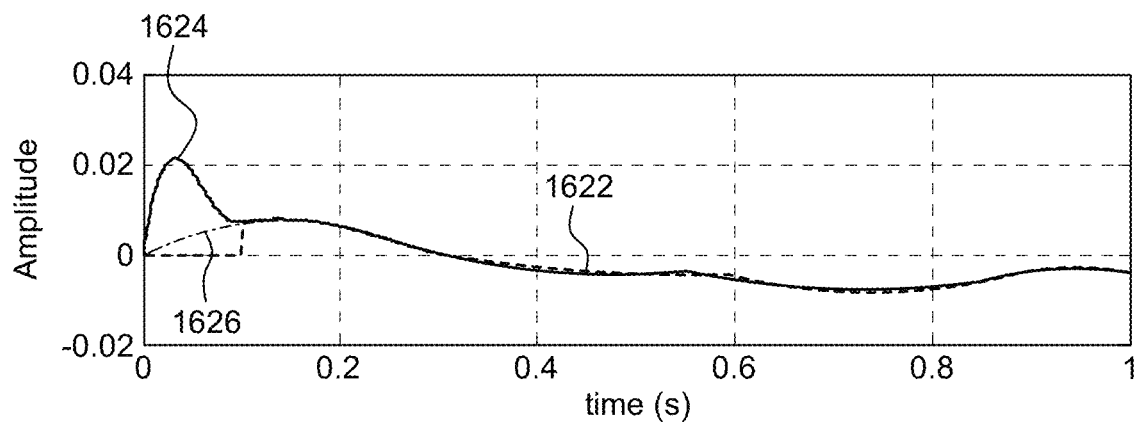
FIG. 16C is another plot illustrating a comparison of synchronization results of disclosed predefined-time synchronization method with a predefined-time synchronization approach of ACLF, according to certain embodiments.
Figure 16D:
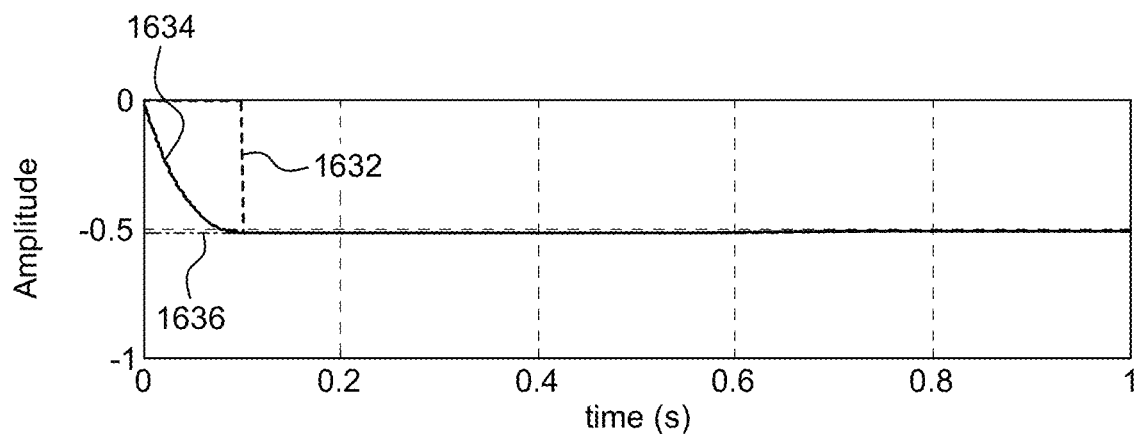
FIG. 16D is another plot illustrating a comparison of synchronization results of disclosed predefined-time synchronization method with a predefined-time synchronization approach of ACLF, according to certain embodiments.

To highlight the merit of the proposed predefined-time synchronization method, a comparison to the recent published predefined-time synchronization approach based on conventional Active Control Lyapunov Function (ACLF) is performed. FIGS. 16A-16D plot the synchronization results. FIG. 16A illustrates a synchronization state $(x_1, \hat{x}_1)$, with an original state 1602, an estimated state 1604 with the method of the disclosure, and an estimated state 1606 with the ACLF. FIG. 16B illustrates a synchronization state $(x_2, \hat{x}_2)$ with an original state 1612, an estimated state 1614 with the method of the disclosure, and an estimated state 1616 with the ACLF. FIG. 16C illustrates a synchronization state ($x_3$, $\hat{x}_3$) with an original state 1622, an estimated state 1624 with the method of the disclosure, and an estimated state 1626 with the ACLF. FIG. 16D illustrates a synchronization state ($x_4$, $\hat{x}_4$) with an original state 1632, an estimated state 1634 with the method of the disclosure, and an estimated state 1636 with the ACLF. It is shown that methods of disclosure and the ACLF carry out a synchronization at the appointed time $t_a$=0.1 s. However, the ACLF tends to show transient peaks and assumes that all state variables of the master system are known and transmitted through the public channel, which causes channel overload. This is a major drawback in secure communication applications based on ACLF. In addition, in the ACLF no uncertainty was considered. Other predefined-time synchronization methods based on Lyapunov function control or sliding mode techniques have similar shortcomings. The advantage of the method proposed in the present invention is to achieve an accurate predefined-time synchronization without transient peaks using an observer with a simple linear action requiring only a single variable control besides taking into account the presence of an un-known input and uncertainties.

For a noisy channel case, the additive noise w(t) is modeled as w(t)=0: 0001 sin(1800 t). The eigenvalues of (A–LC) are selected as {–2.5±i1; –3±i1; –4}, and $\mathbb{L}$ =diag (15; 91: 25; 282: 5; 446: 5; 290) is obtained. The parameter $\sigma_1$, $\sigma_2$ and k are chosen as: 1=0: 53, 2=0: 02 and k=1200. It can be checked numerically that the eigenvalues of $\mathbb{M}$ are complex conjugate with negative real part and moreover the real part $X_i$ and imaginary part $Y_i$, i=$\overline{1,5}$ of these eigenvalues satisfy the conditions $\sigma_1^2 X_i + \sigma_2 Y_i <0$. The system initial conditions are x(0)=$[10^{-6}\ 0.1\ 0.1\ -0.515]^T$ while those of the 2(n+1)-dimensional filtered extended high-gain observer are fixed all to zero. The same unknown input m(t) as for the unfiltered observer is considered. The activation time of the proposed observer is taken as $t_a$=0: 2 s. In order to assess the correct design of the proposed filtered observer, simulation results are provided without noise channel.

Figure 17A:
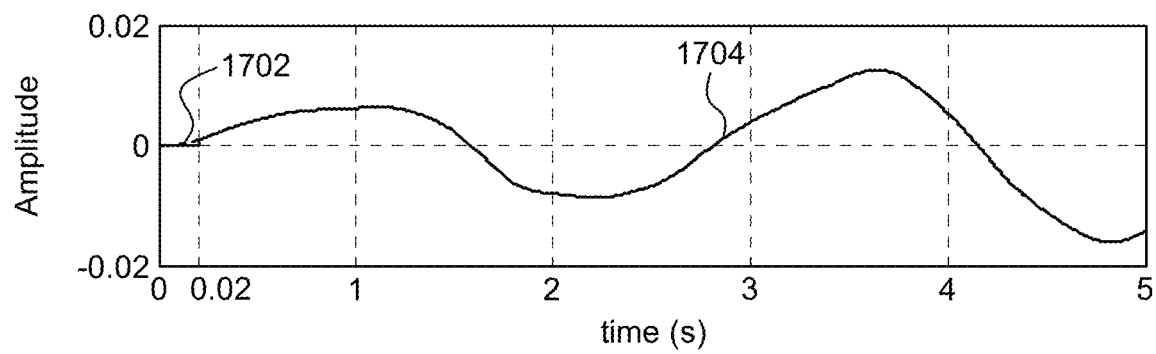
FIG. 17A is a plot illustrating a synchronization result without a noise channel, according to certain embodiments.
Figure 17B:
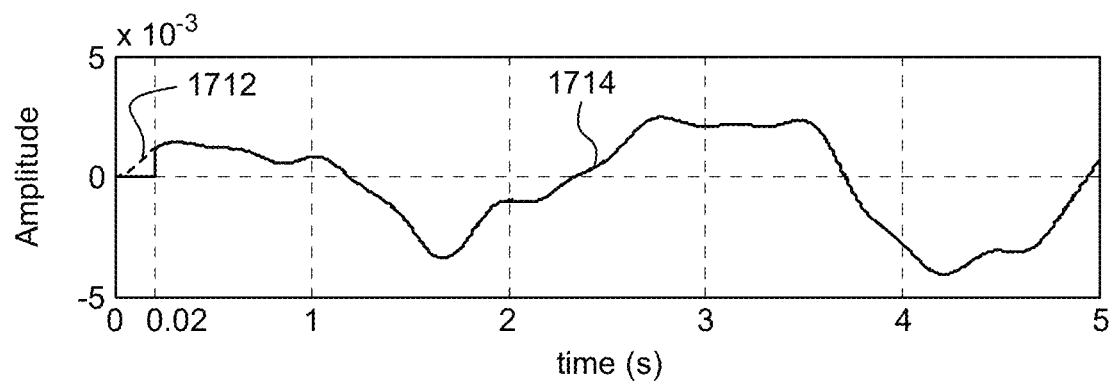
FIG. 17B is another plot illustrating a synchronization result without the noise channel, according to certain embodiments.
Figure 17C:
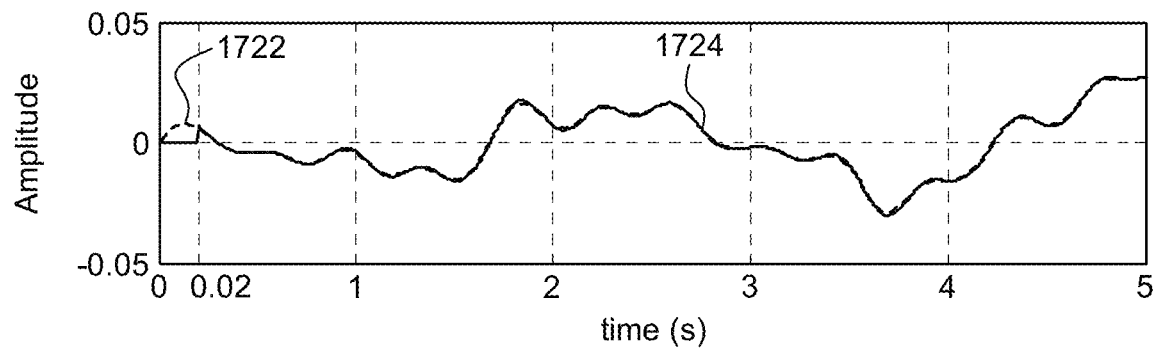
FIG. 17C is another plot illustrating a synchronization result without the noise channel, according to certain embodiments.
Figure 17D:
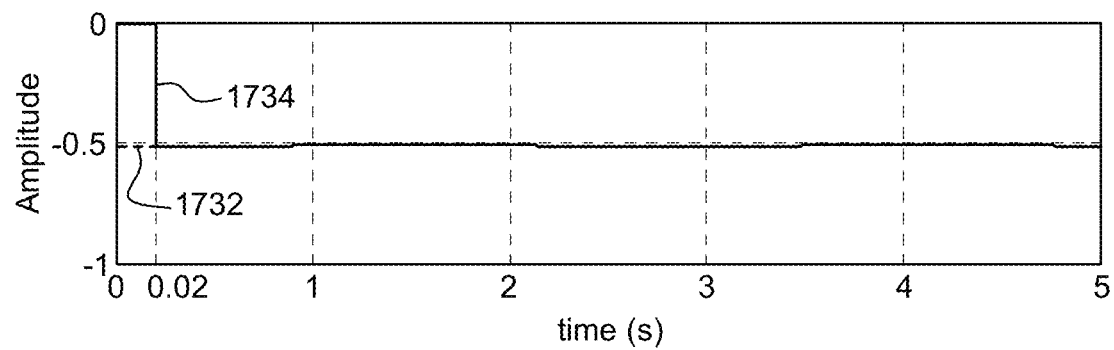
FIG. 17D is another plot illustrating a synchronization result without the noise channel, according to certain embodiments.
Figure 18:
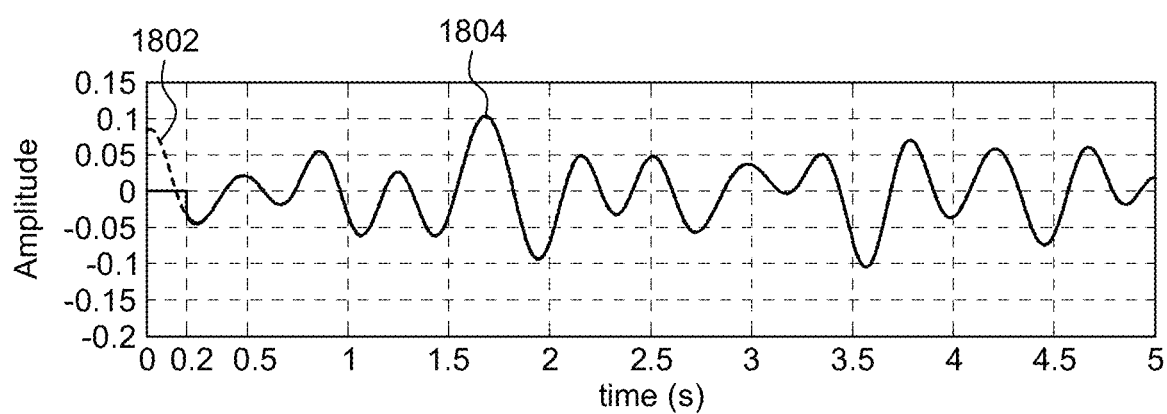
FIG. 18 is a plot illustrating a message reconstruction result achieved by observer of the disclosure, according to certain embodiments.

FIGS. 17A-17D and FIG. 18 show the synchronization results obtained in the ideal case. These curves clearly confirm that the synchronization as well as the recovering of the unknown message are carried out successfully in the predefined time $t_a$=0: 2 s with a relatively small bounded error. FIG. 17A illustrates a synchronization state ($x_1$, $\hat{x}_1$), with an original state 1702 and an estimated state 1704. FIG. 17B illustrates a synchronization state ($x_2$, $\hat{x}_2$) with an original state 1712 and an estimated state 1714. FIG. 17C illustrates a synchronization state ($x_3$, $\hat{x}_3$) with an original state 1722 and an estimated state 1724. FIG. 17D illustrates a synchronization state ($x_4$, $\hat{x}_4$) with an original state 1732 and an estimated state 1734. FIG. 18 shows a message reconstruction of message m(t) 1802 and the restored message $\hat{m}$(t) 1804.

Figure 19A:
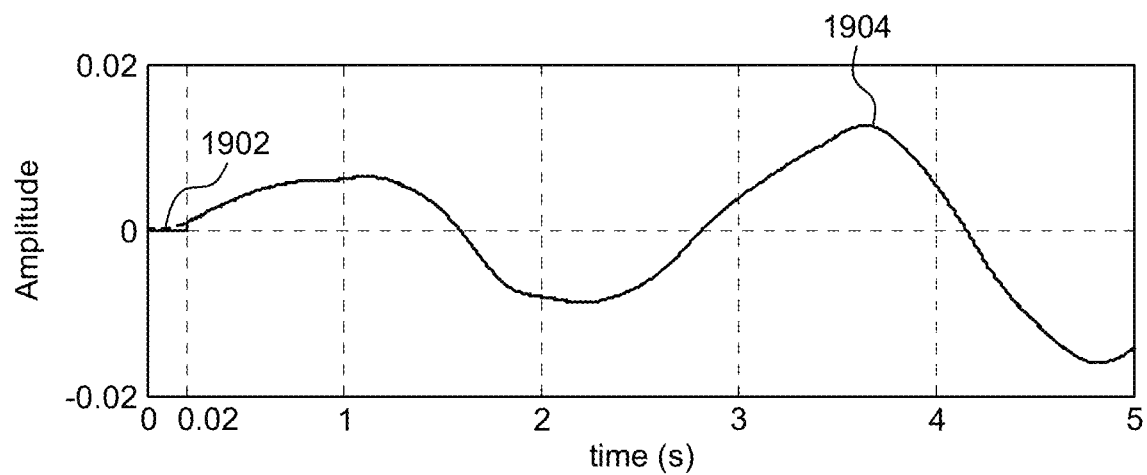
FIG. 19A is a plot illustrating a synchronization result in a noisy channel, according to certain embodiments.
Figure 19B:
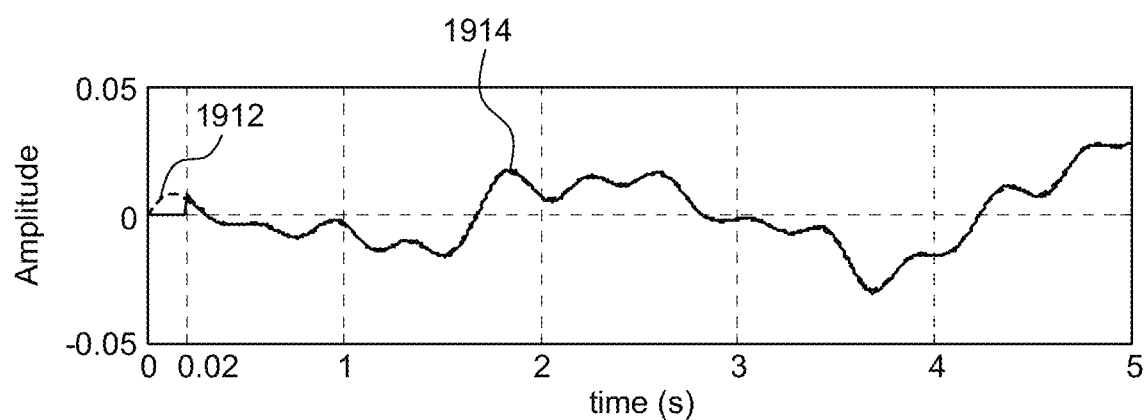
FIG. 19B is another plot illustrating a synchronization result in the noisy channel, according to certain embodiments.
Figure 19C:
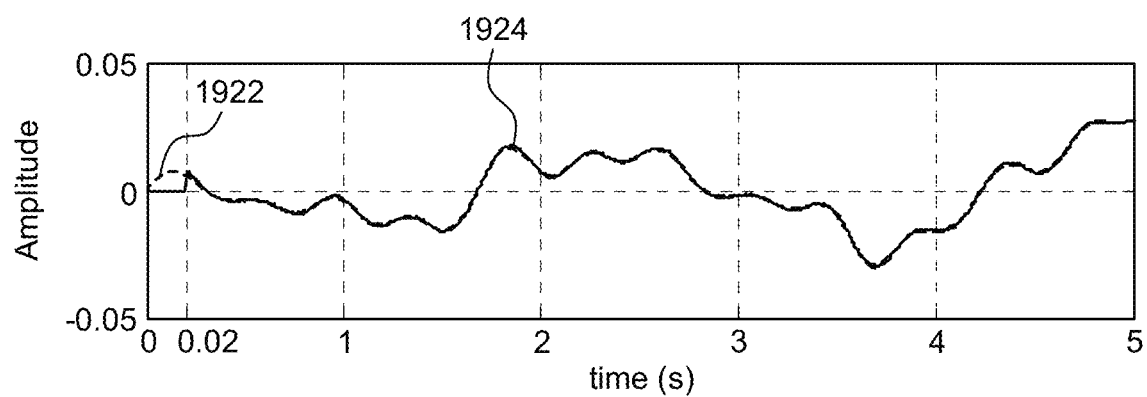
FIG. 19C is another plot illustrating a synchronization result the noisy channel, according to certain embodiments.
Figure 19D:
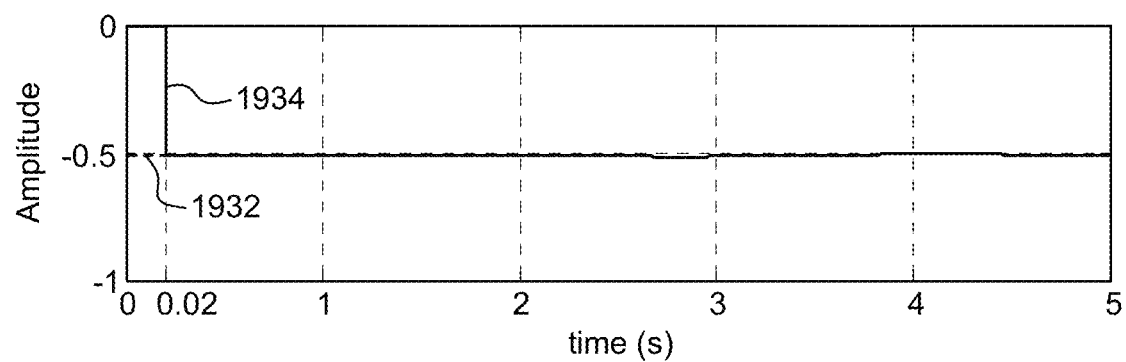
FIG. 19D is another plot illustrating a synchronization result the noisy channel, according to certain embodiments.
Figure 20:
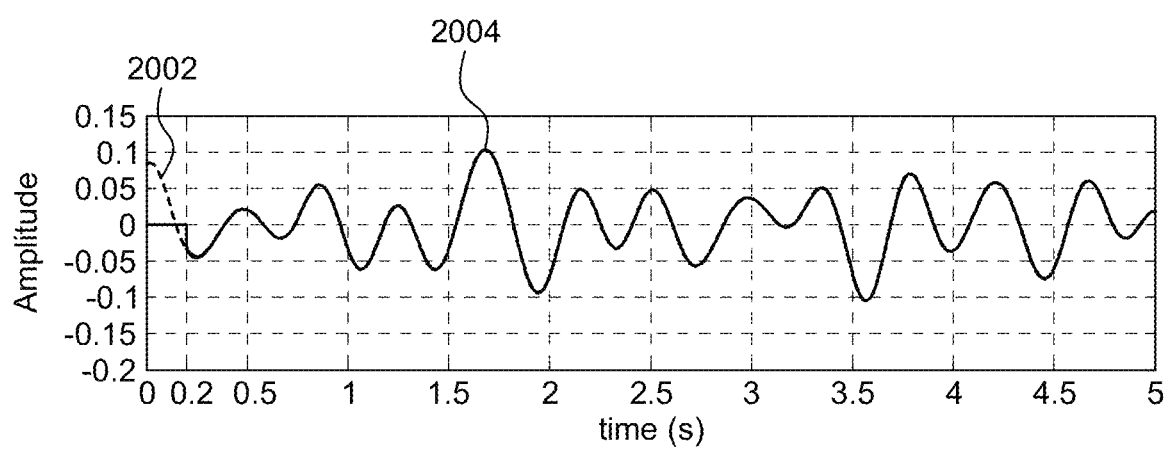
FIG. 20 is a plot illustrating a message reconstruction in a noisy channel, according to certain embodiments.

Synchronization results in the presence of the noise in the transmitted signal are depicted by FIGS. 19A-19D and FIG. 20. Such curves demonstrate the filtering capabilities of the proposed filtered predefined-time extended high-gain observer. FIG. 19A illustrates a synchronization state ($x_1$, $\hat{x}_1$), with an original state 1902 and an estimated state 1904 for $t_a$=0.2 s. FIG. 19B illustrates a synchronization state ($x_2$, $\hat{x}_2$) with an original state 1912 and an estimated state 1914 for $t_a$=0.2 s. FIG. 19C illustrates a synchronization state ($x_3$, $\hat{x}_3$) with an original state 1922 and an estimated state 1924 for $t_a$=0.2 s. FIG. 19D illustrates a synchronization state ($x_4$, $\hat{x}_4$) with an original state 1932 and an estimated state 1934 $t_a$=0.2 s. FIG. 20 shows a message reconstruction of message m(t) 2002 and the restored message $\hat{m}$(t) 2004, $t_a$=0.2 s.

Figure 21A:
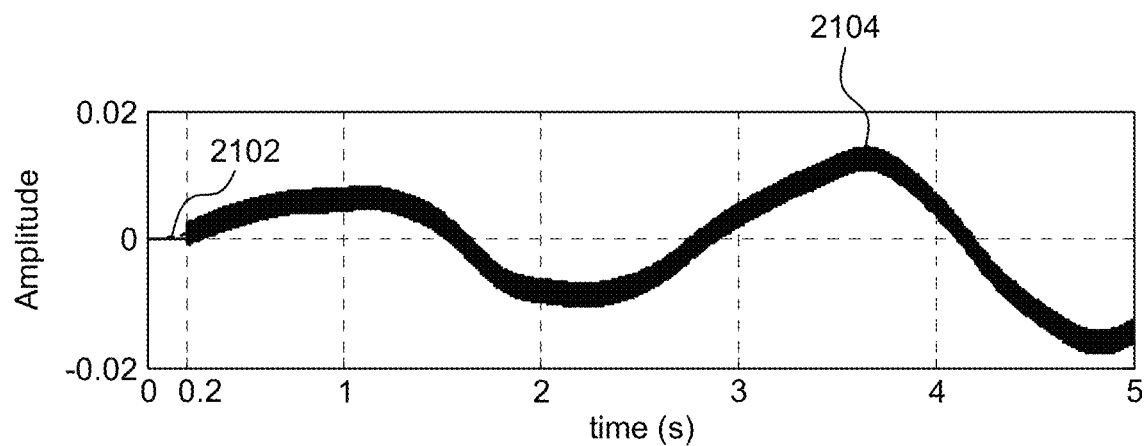
FIG. 21A is a plot illustrating a synchronization result in a noisy channel case, according to certain embodiments.
Figure 21B:
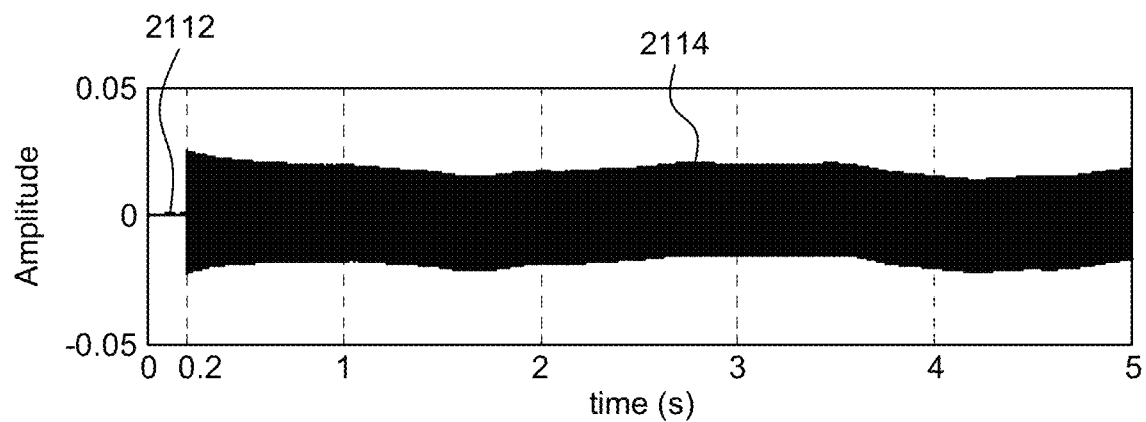
FIG. 21B is another plot illustrating a synchronization result in the noisy channel case, according to certain embodiments.
Figure 21C:
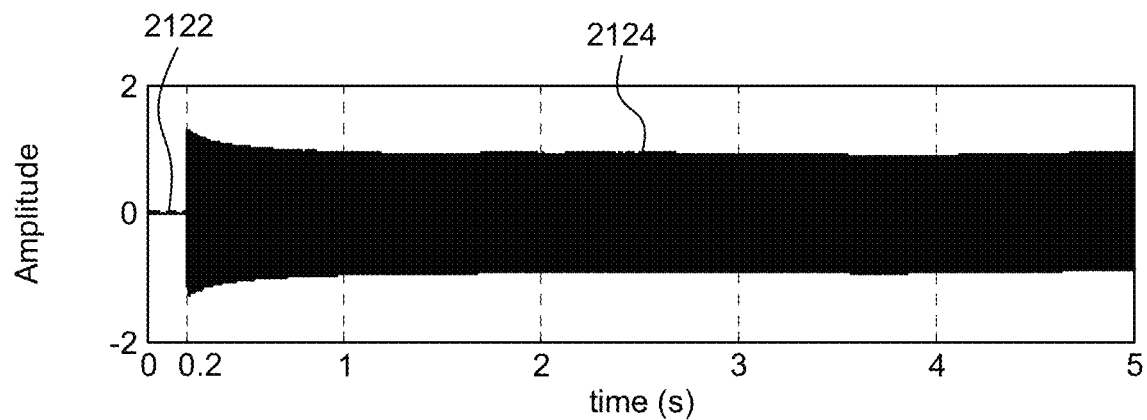
FIG. 21C is another plot illustrating a synchronization result in the noisy channel case, according to certain embodiments.
Figure 21D:
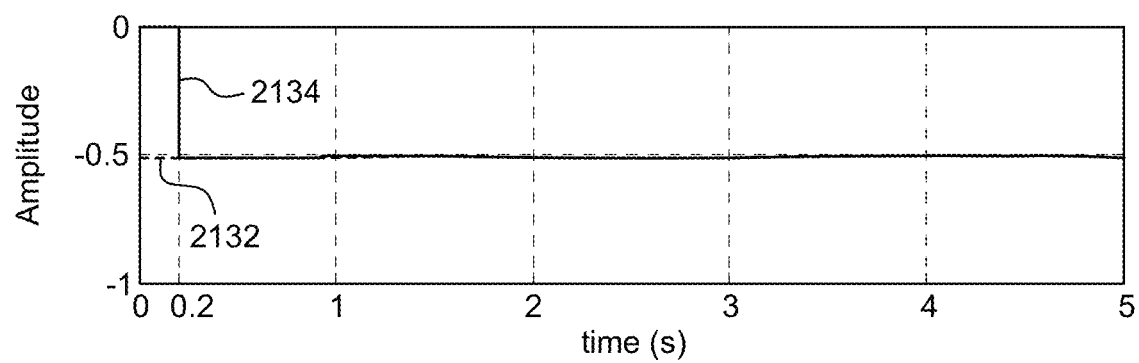
FIG. 21D is another plot illustrating a synchronization result in the noisy channel case, according to certain embodiments.
Figure 22:
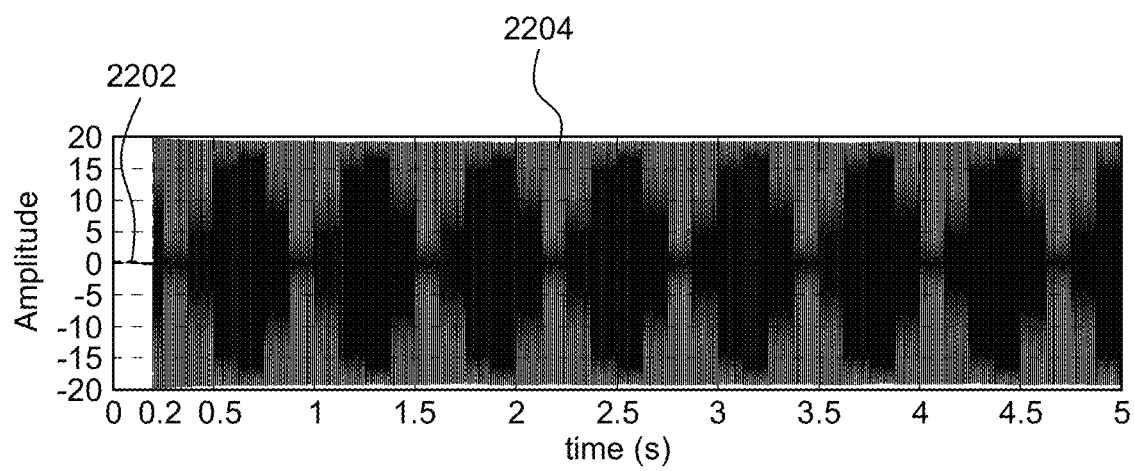
FIG. 22 is a plot illustrating a message reconstruction in the noisy channel case, according to certain embodiments.

To emphasis this feature, simulations have been performed with the unfiltered extended high-gain observer given by Equations (28), (29), and (30) for $\epsilon$=0.01, in the presence of the noise signal w(t). The obtained synchronization results are reported in FIGS. 21A-21D and FIG. 22. Obviously, the synchronization is completely destroyed by the presence of noise in the transmitted signal with the unfiltered high-gain observer. FIG. 21A illustrates a synchronization state ($x_1$, $\hat{x}_1$), with an original state 2102 and an estimated state 2104 for $t_a$=0.2 s. FIG. 21B illustrates a synchronization state ($x_2$, $\hat{x}_2$) with an original state 2112 and an estimated state 2114 for $t_a$=0.2 s. FIG. 21C illustrates a synchronization state ($x_3$, $\hat{x}_3$) with an original state 2122 and an estimated state 2124 for $t_a$=0.2 s. FIG. 21D illustrates a synchronization state ($x_4$, $\hat{x}_4$) with an original state 2132 and an estimated state 2134 for $t_a$=0.2 s. FIG. 22 shows a message reconstruction of message m(t) 2202 and the restored message $\hat{m}$(t) 2204, for $t_a$=0.2 s. These results infer that the filtering action makes it possible to avoid loss of synchronization due to noise. The choice of the two observers design parameters and their influence on the performance of the synchronization are discussed below.

As mentioned above, the choice of the activation time ta depends on the numerical inversion of the transformation matrix T($\mu$(t)). It is desired that ta be small as possible. However, for small enough of $t_a$, numerical irregularities were observed in the simulations. In practical implementation, $t_a$ can be tuned in accordance to the computational software and hardware capabilities. For the fixed-time extended high-gain observer (28)-(30), the gains $k_i$ are chosen such that the matrix F is Hurwitz. The choice of eigenvalues of F does not have much incidence. The important parameter that is to be chosen is $\epsilon$. As it has been underlined in several works, this parameter is to be chosen small enough in order to increase the robustness. For standard high-gain observer, in the absence of noise, large gains injection due to small values of $\epsilon$ introduces two major issues. First, undesirable peaks appear in the transient response. Second, the numerical implementation of the high-gain observer becomes very hard. The first drawback is eliminated with the use of modulating functions. The uncertainty $$\frac{d\eta}{dt}$$

is bounded by $D_1$. Thus, $\epsilon$ is to be fixed to ensure the convergence of the estimation error in the presence of uncertainties. In addition, note that the estimation error is bounded by $\epsilon^2 \rho_x$. By simulations, $D_1$ is estimated about $D_1$=1.16. To compromise between estimation accuracy and numerical implementation, the parameter $\epsilon$ is the set at $\epsilon$=0.001 based on the heuristic try and error tuning procedure. In the case of noisy channel case, first the gain k is chosen sufficiently large with respect to the bounds of the total disturbance. However, a large value of k yields to large estimation error due to the noise. The high-gain parameter k of the filtered extended high-gain observer is powered up to two (2) independently of the dimension n of the system. In contrary, for the unfiltered high-gain observer, the gain injection is powered up to n. In order to get a reduced estimation error due to the noise for large value of k, $\sigma_2$ is chosen small enough to reduce $\mathbb{B}_N$. Eigenvalues of (A−LC) are arbitrary chosen stable and L is determined by pole placement procedure. Finally, the parameter $\sigma_2$ is fixed to a value such that the eigen-values of (A−LC) satisfy the sector inclusion condition. Again, here, the trial and error tuning procedure is used to set the values of these parameters.

The method of the disclosure uses a single channel synchronization protocol with a single output channel being used. All state variables of the master system are assumed to be unknown, whereas, in most other conventional methods, control laws require the availability of all state variables, which are sent through the public channel. This is a major drawback for the design of secure transmission schemes in the conventional methods since it introduces channel overload. The method of the disclosure deals with recovering the secret message, considered an unknown input, while conventional methods are limited to estimating the state variables only. Further method of the disclosure, the secret message is also hidden by inclusion in the chaotic dynamics, which significantly improves the security level. Contrary to fixed-time synchronization methods based on Lyapunov functions or on sliding mode techniques, the method of the disclosure enables to obtain an instantaneous convergence, without a transient response, in a predefined time chosen independently from initial conditions and system parameters (deadbeat observer). The observer (modified high-gain observer) of the disclosure uses a simple linear Luenberger-like action. Further in the design of synchronization schemes based on master-slave configuration, additive noise in the link between master and slave remains a challenging problem. The corruption of the output control signal transmitted from the master to the slave by the noise channel gives rise to unsatisfactory performance and can destroy the synchronization process. In the method of the disclosure, a new predefined-time filtered high-gain observer is developed to ensure the success of the synchronization in the presence of the channel noise.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A secure encryption-decryption system comprising:
an emitter comprising:
an encryptor configured to generate a chaotic signal including a confidential message, and to modulate the generated chaotic signal;
a single channel over which the modulated chaotic signal is communicated from the emitter; and
a receiver to receive the modulated chaotic signal from the single channel, the receiver comprising:
a decryptor configured to construct an unknown input high-gain observer with single-channel predefined-time synchronization to demodulate the received modulated chaotic signal to output the confidential message,
wherein the emitter comprises a chaotic emitter including a memristive chaotic oscillator, and
wherein the confidential message is injected into the chaotic signal in a derivative of a third state variable of the chaotic emitter.

2. The secure encryption-decryption system according to claim 1, wherein the decryptor estimates the derivative of the third state variable of the chaotic emitter in outputting the confidential message.

3. The secure encryption-decryption system according to claim 2, wherein the decryptor further executes a Runge-Kutta algorithm with a sampling step in demodulating the received modulated chaotic signal.

4. The secure encryption-decryption system according to claim 3, wherein the unknown input high-gain observer is activated to demodulate after an activation time.

5. The secure encryption-decryption system according to claim 4, wherein initial conditions of the decryptor are set to zero, and the activation time is a predetermined set time.

6. The secure encryption-decryption system according to claim 5, wherein the decryptor performs demodulation based on a selected modulation function as a positive increasing function with no zero-crossing and that implements first and second coordinate transformations.

7. The secure encryption-decryption system according to claim 6, wherein the decryptor further sets an observer gain by choosing stable poles and determining the observer gain by a pole placement procedure.

8. The secure encryption-decryption system according to claim 5, wherein
the modulated chaotic signal from the encryptor includes additive noise, and
the decryptor performs demodulation based on a selected modulation function as a positive increasing function with no zero-crossing and that implements first and second coordinate transformations.

9. A secure encryption-decryption method, comprising:
emitting information with an emitter, the emitting comprising:
generating, by an encryptor, a chaotic signal including a confidential message and modulating the generated chaotic signal;
communicating, over a single channel, the modulated chaotic signal from the emitter; and
receiving, at a receiver, the modulated chaotic signal from the single channel, the receiving comprising:
constructing, by a decryptor, an unknown input high-gain observer with single-channel predefined-time synchronization and demodulating the received modulated chaotic signal to output the confidential message,
wherein the emitter comprises a chaotic emitter including a memristive chaotic oscillator, and
wherein during the generating the confidential message is injected into the chaotic signal in a derivative of a third state variable of the chaotic emitter.

10. The secure encryption-decryption method according to claim 9, wherein the constructing, in the decryptor, estimates the derivative of the third state variable of the chaotic emitter in outputting the confidential message.

11. The secure encryption-decryption method according to claim 10, wherein the constructing, in the decryptor, further executes a Runge-Kutta algorithm with a sampling step in demodulating the received modulated chaotic signal.

12. The secure encryption-decryption method according to claim 11, wherein the unknown input high-gain observer is activated to demodulate after an activation time.

13. The secure encryption-decryption method according to claim 12, wherein initial conditions of the decryptor are set to zero, and the activation time is a predetermined set time.

14. The secure encryption-decryption method according to claim 13, wherein the constructing, in the decryptor, performs demodulation based on a selected modulation function as a positive increasing function with no zero-crossing and that implements first and second coordinate transformations.

15. The secure encryption-decryption method according to claim 14, wherein the constructing, in the decryptor, further sets an observer gain by choosing stable poles and determining the observer gain by a pole placement procedure.

16. The secure encryption-decryption method according to claim 13, wherein
the modulated chaotic signal from the encryptor includes additive noise, and
the constructing, in the decryptor, performs demodulation based on a selected modulation function as a positive increasing function with no zero-crossing and that implements first and second coordinate transformations.

\* \* \* \* \*